(12) United States Patent
Lee

(10) Patent No.: US 11,412,246 B2
(45) Date of Patent: Aug. 9, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/057,231

(22) PCT Filed: Jun. 7, 2019

(86) PCT No.: PCT/KR2019/006909
§ 371 (c)(1),
(2) Date: Nov. 20, 2020

(87) PCT Pub. No.: WO2019/235893
PCT Pub. Date: Dec. 12, 2019

(65) Prior Publication Data
US 2021/0211705 A1    Jul. 8, 2021

(30) Foreign Application Priority Data

Jun. 8, 2018 (KR) .................. 10-2018-0065897

(51) Int. Cl.
*H04N 19/51* (2014.01)
*H04N 19/105* (2014.01)
*H04N 19/176* (2014.01)

(52) U.S. Cl.
CPC ........... *H04N 19/51* (2014.11); *H04N 19/105* (2014.11); *H04N 19/176* (2014.11)

(58) Field of Classification Search
CPC ..... H04N 19/52; H04N 19/176; H04N 19/105
See application file for complete search history.

(56) References Cited

U.S. PATENT DOCUMENTS

2014/0269916 A1    9/2014  Lim et al.
2015/0163494 A1*   6/2015  Park .................. H04N 19/61
                                                375/240.02
(Continued)

FOREIGN PATENT DOCUMENTS

KR   10-2017-0131446 A    11/2017
WO   2013/081365 A1        6/2013
(Continued)

OTHER PUBLICATIONS

Jicheng An et al., "Enhanced Merge Mode based on JEM7.0", Document: JVET-J0059-v1 , Joint Video Experts Team (JVET) of ITU-T SG 16 WP 3 and ISO/IEC JTC 1/SC 29/WG 11, 10th Meeting: San Diego, US, Apr. 10-20, 2018, pp. 1-14.

*Primary Examiner* — Anner N Holder
(74) *Attorney, Agent, or Firm* — IP Legal Services, LLC

(57) ABSTRACT

An image decoding method according to the present invention can comprise the steps of: deriving merge candidates from neighboring blocks adjacent to a current block; generating a merge candidate list including the merge candidates, wherein the arrangement order of the merge candidates in the merge candidate list is determined on the basis of initial priorities; re-arranging the merge candidates included in the merge candidate list; decoding information for specifying at least one of the merge candidates included in the merge candidate list; and deriving motion information of the current block from a merge candidate corresponding to the information.

5 Claims, 17 Drawing Sheets

(56) References Cited

U.S. PATENT DOCUMENTS

| | | |
|---|---|---|
| 2016/0044331 A1 | 2/2016 | Lim et al. |
| 2016/0269742 A1 | 9/2016 | Lim et al. |
| 2016/0277749 A1 | 9/2016 | Lim et al. |
| 2016/0286229 A1 | 9/2016 | Li et al. |
| 2016/0286230 A1 | 9/2016 | Li et al. |
| 2016/0286232 A1 | 9/2016 | Li et al. |
| 2017/0310988 A1* | 10/2017 | Lin ................. H04N 19/513 |
| 2017/0332097 A1 | 11/2017 | Lee et al. |
| 2017/0332099 A1* | 11/2017 | Lee ................. H04N 19/122 |
| 2018/0103264 A1* | 4/2018 | Sugio ............... H04N 19/513 |
| 2018/0352247 A1 | 12/2018 | Park et al. |

FOREIGN PATENT DOCUMENTS

| | | |
|---|---|---|
| WO | 2016/085231 A1 | 6/2016 |
| WO | 2017/052081 A1 | 3/2017 |

\* cited by examiner

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2019/006909 (filed on Jun. 7, 2019) under 35 U.S.C. § 371, which claims priority to Korean Patent Application No. 10-2018-0065897 (filed on Jun. 8, 2018), the teachings of which are incorporated herein in their entireties by reference.

TECHNICAL FIELD

The present invention relates to a method and an apparatus for processing a video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

The present invention is to provide a method and apparatus for effectively performing inter-prediction on an encoding/decoding target block when encoding/decoding a video signal.

The present invention is to provide a method and apparatus for performing motion compensation by using a plurality of merge candidate lists when encoding/decoding a video signal.

The present invention is to provide a method and apparatus of rearranging merge candidates in encoding/decoding a video signal.

Technical problems obtainable from the present invention are non-limited the above-mentioned technical task, and other unmentioned technical tasks can be clearly understood from the following description by those having ordinary skill in the technical field to which the present invention pertains.

Technical Solution

A method and an apparatus of decoding a video signal according to the present invention may derive merge candidates from neighboring blocks adjacent to a current block, generate a merge candidate list including the merge candidates, rearrange the merge candidates included in the merge candidate list, decode information for specifying at least one of the merge candidates included in the merge candidate list, and derive motion information of the current block from a merge candidate corresponding to the information. In this case, an initial arrangement order of the merge candidates in the merge candidate list may be determined based on an initial priority.

A method and an apparatus of encoding a video signal according to the present invention may derive merge candidates from neighboring blocks adjacent to a current block, generate a merge candidate list including the merge candidates, rearrange the merge candidates included in the merge candidate list, encode information for specifying at least one of the merge candidates included in the merge candidate list, and derive motion information of the current block from a merge candidate corresponding to the information. In this case, an initial arrangement order of the merge candidates in the merge candidate list may be determined based on an initial priority.

In the method and apparatus of encoding/decoding a video signal according to the present invention, the rearrangement may be performed based on a rearrangement priority between the merge candidates, and the rearrangement priority may be determined based on whether a merge candidate has bi-directional information.

In the method and apparatus of encoding/decoding a video signal according to the present invention, a merge candidate having bi-directional information has a higher rearrangement priority than a merge candidate having only uni-directional information.

In the method and apparatus of encoding/decoding a video signal according to the present invention, a rearrangement priority of merge candidates having bi-directional information may be determined according to the initial priority of the merge candidates.

In the method and apparatus of encoding/decoding a video signal according to the present invention, the motion information is derived from a plurality of merge candidates.

In the method and apparatus of encoding/decoding a video signal according to the present invention, first direction motion information of the current block may be derived from a first merge candidate among the plurality of merge candidates, and second direction motion information of the current block may be derived from a second merge candidate among the plurality of merge candidates.

The features briefly summarized above with respect to the present invention are merely exemplary aspects of the detailed description of the present invention to be described later, and do not limit the scope of the present invention.

Advantageous Effects

According to the present invention, efficiency of inter-prediction can be enhanced by performing motion compensation by using a plurality of merge candidate lists.

According to the present invention, efficiency of inter-prediction can be enhanced by obtaining motion information based on a plurality of merge candidates.

According to the present invention, a method of efficiently encoding/decoding a merge index can be provided by rearranging merge candidates.

Effects obtainable from the present invention may be non-limited by the above-mentioned effect, and other unmentioned effects can be clearly understood from the following description by those having ordinary skill in the technical field to which the present invention pertains.

MODE FOR INVENTION

Figure 1:
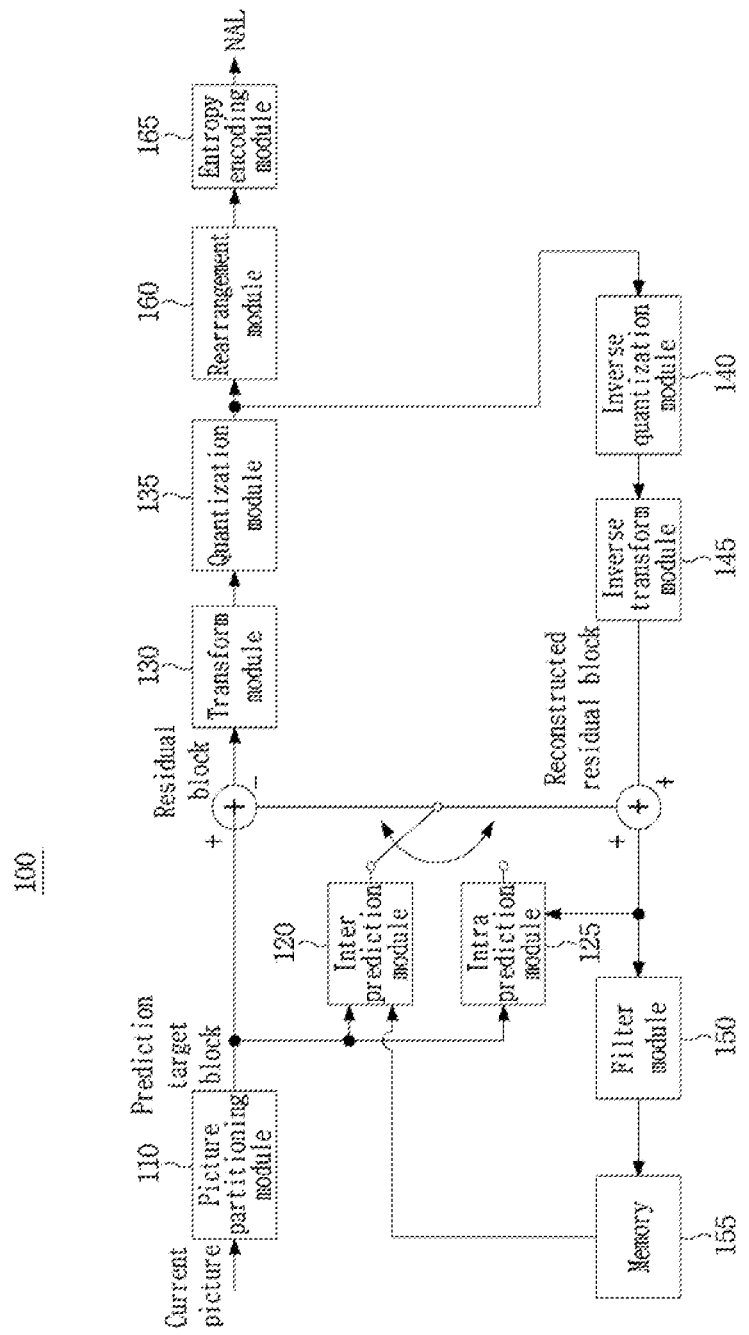
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

In the present disclosure, when an element is referred to as being "connected" or "coupled" to another element, it is understood to include not only that the element is directly connected or coupled to that another element but also that there may be another element therebetween. When an element is referred to as being "directly connected" or "directly coupled" to another element, it is understood that there is no other element therebetween.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
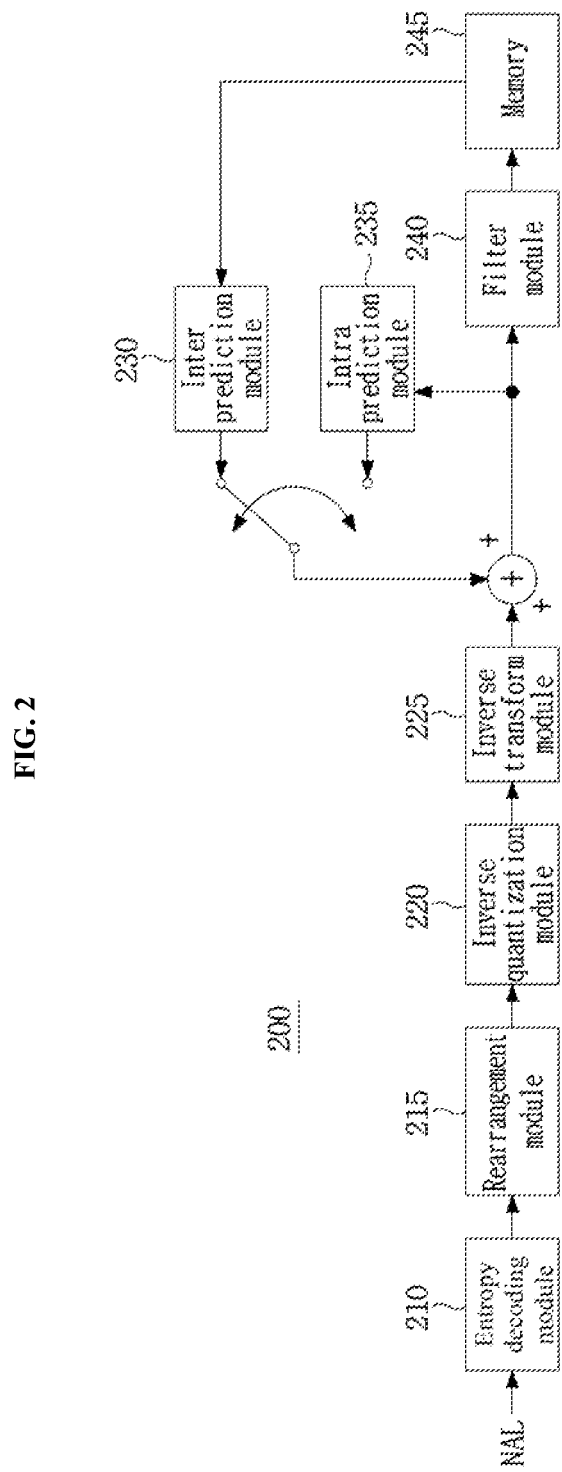
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this description, 'unit' may represent a base unit for performing a specific encoding/decoding process and 'block' may represent a predetermined-sized sample array. Unless otherwise specified, 'block' and 'unit' may be used as the same meaning. For example, in the after-mentioned example, it may be understood that a coding block and a coding unit mutually have the same meaning.

One picture may be encoded/decoded by being divided into base blocks having a square shape or a non-square shape. At this time, the base block may be referred to as a coding tree unit. The coding tree unit may be defined as a coding unit of the largest size allowed within a sequence or a slice. Information representing whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Alternatively, a prediction block having the same size as a coding block or smaller than a coding block may be determined by the prediction partitioning of a coding block. For the prediction partitioning of a coding block, any one of partition mode (Part_mode) candidates representing a partitioning shape of a coding block may be specified. Information for determining a partition index indicating any one of partition mode candidates may be signaled through a bitstream. Alternatively, the partition index of a coding block may be determined based on at least one of a size, a shape, or an encoding mode of a coding block. The size or shape of a prediction block may be determined based on a partition mode specified by the partition index. A partition mode candidates may include an asymmetric partition shape (e.g., nL×2N, nR×2N, 2N×nU, 2N×nD). The number or type of asymmetric partition mode candidates available for a coding block may be determined based on at least one of the size, a shape, or an encoding mode of a coding block.

Figure 3:
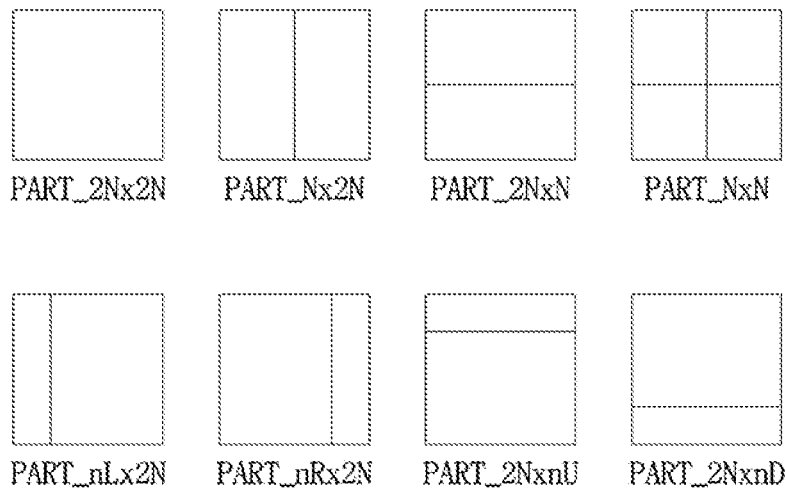
FIG. 3 is a diagram illustrating a partition mode candidate which may be applied to a coding block when a coding block is encoded by inter prediction.

FIG. 3 is a diagram illustrating a partition mode candidate which may be applied to a coding block when a coding block is encoded by inter prediction.

When a coding block is encoded by inter prediction, any one of 8 partition mode candidates shown in FIG. 3 may be applied to a coding block.

On the other hand, when a coding block is encoded by intra prediction, only a square partition partitioning may be applied to a coding block. In other words, when a coding block is encoded by intra prediction, a partition mode, PART_2N×2N or PART_N×N, may be applied to a coding block.

PART_N×N may be applied when a coding block has the minimum size. Herein, the minimum size of a coding block may be predefined in an encoder and a decoder. Alternatively, information regarding the minimum size of a coding block may be signaled through a bitstream. In an example, the minimum size of a coding block may be signaled through a slice header. Accordingly, the minimum size of a coding block may be differently determined per slice.

In another example, a partition mode candidate available for a coding block may be differently determined according to at least one of the size or shape of a coding block. In an example, the number or type of partition mode candidates available for a coding block may be differently determined according to at least one of the size or shape of a coding block.

Alternatively, the type or number of asymmetric partition mode candidates available for a coding block may be determined based on the size or shape of a coding block. The number or type of asymmetric partition mode candidates available for a coding block may be differently determined according to at least one of the size or shape of a coding block. In an example, when a coding block has a non-square shape that width is greater than height, at least one of PART_2N×N, PART_2N×nU or PART_2N×nD may not be used as a partition mode candidate of a coding block. When a coding block has a non-square shape that height is greater than width, at least one of PART_N×2N, PART_nL×2N, PART_nR×2N may not be used as a partition mode candidate of a coding block.

Generally, a prediction block may have a 4×4 to 64×64 size. But, when a coding block is encoded by inter prediction, a prediction block may be restricted not to have a 4×4 size to reduce memory bandwidth in performing motion compensation.

Based on a partition mode, a coding block may be recursively partitioned. In other words, based on a partition mode determined by a partition index, a coding block may be partitioned and each partition generated by partitioning a coding block may be defined as a coding block.

Hereinafter, a method of partitioning a coding unit will be described in more detail. In the after-mentioned example, a coding unit may mean a coding tree unit or a coding unit included in a coding tree unit. In addition, 'a partition' generated by partition a coding block may mean 'a coding block.' The after-mentioned partitioning method may be applied when a coding block is partitioned into a plurality of prediction blocks or transform blocks.

A coding unit may be partitioned by at least one line. In this case, an angle of a line which partitions a coding unit may be a value within a range of 0 to 360 degree. For example, the angle of a horizontal line may be 0 degree, the angle of a vertical line may be 90 degree, the angle of a diagonal line in a right-top direction may be 45 degree and the angle of a left-top diagonal line may be 135 degree.

When a coding unit is partitioned by a plurality of lines, all of a plurality of lines may have the same angle. Alternatively, at least one of a plurality of lines may have a different angle from other lines. Alternatively, a plurality of lines partitioning a coding tree unit or a coding unit may have a predefined angle difference (e.g., 90 degree).

Information regarding a line partitioning a coding unit may be determined by a partition mode. Alternatively, information on at least one of the number, direction, angle or position in a block of a line may be encoded.

For convenience of description, in the after-mentioned example, it is assumed that a coding unit is partitioned into a plurality of coding units by using at least one of a vertical line or a horizontal line.

The number of vertical lines or horizontal lines partitioning a coding unit may be at least one or more. In an example, a coding unit may be partitioned into 2 partitions by using one vertical line or one horizontal line. Alternatively, a coding unit may be partitioned into 3 partitions by using two vertical lines or two horizontal lines. Alternatively, a coding unit may be partitioned into 4 partitions of which width and height are half of a coding unit, by using one vertical line or one horizontal line.

When a coding unit is partitioned into a plurality of partitions by using at least one vertical line or at least one horizontal line, partitions may have a uniform size. Alternatively, one partition may have a different size from other partitions or each partition may have a different size. In an example, when a coding unit is partitioned by two horizontal lines or two vertical lines, a coding unit may be partitioned into 3 partitions. In this case, a width or height ratio of 3 partitions may be n:2n:n, 2n:n:n, or n:n:2n.

In the after-mentioned examples, partitioning a coding block into 4 partitions is referred to as a quad tree-based partitioning. And, partitioning a coding block into 2 partitions is referred to as a binary tree-based partitioning. In addition, partitioning a coding block into 3 partitions is referred to as a triple tree-based partitioning.

In the after-mentioned drawing, it will be shown that one vertical line and/or one horizontal line is used to partition a coding unit, but it will be described that partitioning a coding unit into more partitions than shown by using more vertical lines and/or more horizontal lines than shown or partitioning a coding unit into fewer partitions than shown is also included in the range of the present invention.

Figure 4:
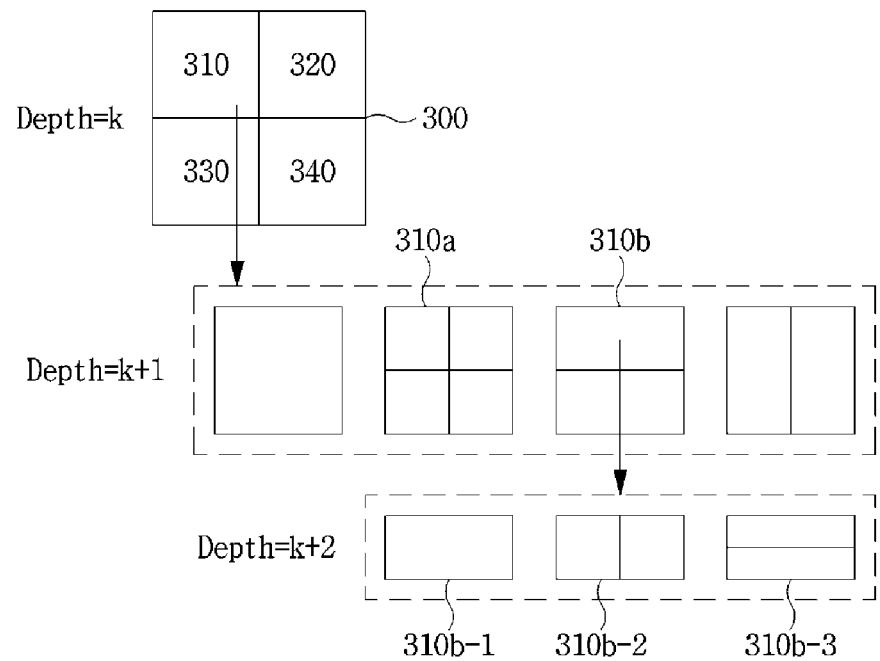
FIG. 4 shows an example of hierarchically partitioning a coding block based on a tree structure as an embodiment to which the present invention is applied.

FIG. 4 shows an example of hierarchically partitioning a coding block based on a tree structure as an embodiment to which the present invention is applied An input video signal is decoded in a predetermined block unit and a base unit for decoding an input video signal is referred to as a coding block. A coding block may be a unit of performing intra/inter prediction, transform and quantization. In addition, a prediction mode (e.g., an intra prediction mode or an inter prediction mode) may be determined in a unit of a coding block and prediction blocks included in a coding block may share a determined prediction mode. A coding block may be a square or non-square block in an arbitrary size within a range of 8×8 to 64×64 or a square or non-square block with a size of 128×128, 256×256 or more.

Specifically, a coding block may be hierarchically partitioned based on at least one of a quad tree partitioning method, a binary tree partition method or a triple tree partitioning method. A quad tree-based partitioning may mean a method in which a 2N×2N coding block is partitioned into four N×N coding blocks. A binary tree-based partitioning may mean a method in which one coding block is partitioned into two coding blocks. A triple tree-based partitioning may mean a method in which one coding block is partitioned into three coding blocks. Even when triple tree or binary tree-based partitioning is performed, a square coding block may exist at a lower depth.

Partitions generated by binary tree-based partitioning may be symmetric or asymmetric. In addition, a coding block partitioned based on a binary tree may be a square block or a non-square block (e.g., a rectangle).

Figure 5:
FIG. 5 is a diagram showing a partition shape in which a binary tree-based partitioning is allowed as an embodiment to which the present invention is applied.
Figure 5:
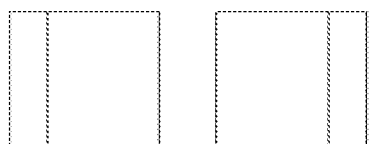
Figure 5:
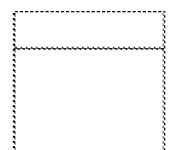
Figure 5:

FIG. 5 is a diagram showing a partitioning shape for a coding block based on binary tree partitioning. A partition shape of a coding block based on binary tree partitioning may include a symmetric type such as 2N×N (a non-square coding unit in a horizontal direction) or N×2N (a non-square coding unit in a vertical direction), etc. or an asymmetric type such as nL×2N, nR×2N, 2N×nU or 2N×nD, etc. Only one of the symmetric type or the asymmetric type may be allowed as a partitioning shape of a coding block.

A triple tree partitioning shape may include at least one of a shape partitioning a coding block into 2 vertical lines or a shape partitioning a coding block into 2 horizontal lines. 3 non-square partitions may be generated by triple tree partitioning.

Figure 6:
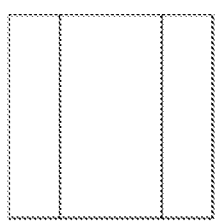
FIG. 6 shows a triple tree partitioning shape.
Figure 6:
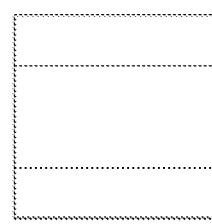

FIG. 6 shows a triple tree partitioning shape.

A triple tree partitioning shape may include a shape partitioning a coding block into 2 horizontal lines or a shape partitioning a coding block into 2 vertical lines. The width or height ratio of partitions generated by partitioning a coding block may be n:2n:n, 2n:n:n or n:n:2n.

The position of a partition with the largest width or height among 3 partitions may be predefined in an encoder and a decoder. Alternatively, information indicating a partition with the largest width or height among 3 partitions may be signaled through a bitstream.

Only partitioning of a square shape or a non-square symmetric shape may be allowed for a coding unit. In this case, partitioning a coding unit into square partitions may correspond to quad tree CU partitioning, and partitioning a coding unit into non-square partitions in a symmetric shape may correspond to binary tree partitioning. Partitioning a coding tree unit into square partitions and non-square partitions in a symmetric shape may correspond to quad tree and binary tree CU partitioning (QTBT).

Binary tree or triple tree-based partitioning may be performed for a coding block in which quad tree-based partitioning is not performed any more. A coding block generated by binary tree or triple tree-based partitioning may be partitioned into smaller coding blocks. In this case, at least one of quad tree partitioning, triple tree partitioning or binary tree partitioning may be set not to be applied to the coding block. Alternatively, a binary tree partitioning in a predetermined direction or a triple tree partitioning in a predetermined direction may not be allowed for the coding block. In an example, quad tree partitioning and triple tree partitioning may be set to be unallowable for a coding block generated by binary tree or triple tree-based partitioning. Only binary tree partitioning may be allowed for the coding block.

Alternatively, only the largest coding block among 3 coding blocks generated by triple tree-based partitioning may be partitioned into smaller coding blocks. Alternatively, binary tree-based partitioning or triple tree-based partitioning may be allowed only for the largest coding block among 3 coding blocks generated by triple tree-based partitioning.

The partitioning shape of a lower depth partition may be dependently determined based on the partitioning shape of an upper depth partition. In an example, when an upper partition and a lower partition are partitioned based on a binary tree, only binary tree-based partitioning in the same shape as a binary tree partitioning shape of an upper depth partition may be allowed for a lower depth partition. For example, when the binary tree partitioning shape of an upper depth partition is 2N×N, the binary tree partitioning shape of a lower depth partition may be also set to be 2N×N. Alternatively, when the binary tree partitioning shape of an upper depth partition is N×2N, the partitioning shape of a lower depth partition may be also set to be N×2N.

Alternatively, binary tree partitioning in the same partitioning direction as an upper depth partition or triple tree partitioning in the same partitioning direction as an upper depth partition may be set to be unallowable for the largest partition among partitions generated by triple tree-based partitioning.

Alternatively, the partitioning shape of a lower depth partition may be determined by considering the partitioning shape of an upper depth partition and the partitioning shape of a neighboring lower depth partition. Concretely, if an upper depth partition is partitioned based on a binary tree, the partitioning shape of a lower depth partition may be determined so that the same result as that of partitioning an upper depth partition based on a quad tree does not occur. In an example, when the partitioning shape of an upper depth partition is 2N×N and the partitioning shape of a neighboring lower depth partition is N×2N, the partitioning shape of a current lower depth partition may not be set to be N×2N. It is because when the partitioning shape of a current lower depth partition is N×2N, it causes the same result as that of partitioning an upper depth partition based on a N×N-shaped quad tree. When the partitioning shape of an upper depth partition is N×2N and the partitioning shape of a neighboring lower depth partition is 2N×N, the partitioning shape of a current lower depth partition may not be set to be 2N×N. In other words, when the binary tree partitioning shape of an upper depth partition is different from the binary tree partitioning shape of a neighboring lower depth partition, the binary tree partitioning shape of a current lower depth partition may be set the same as the binary tree partitioning shape of an upper depth partition.

Alternatively, the binary tree partitioning shape of a lower depth partition may be set to be different from the binary tree partitioning shape of an upper depth partition.

An allowable binary tree partitioning shape may be determined in a unit of a sequence, a slice or a coding unit. In an example, a binary tree partitioning shape allowable for a coding tree unit may be limited to a 2N×N or N×2N shape. An allowable partitioning shape may be predefined in an encoder or a decoder. Alternatively, information on an allowable partitioning shape or an unallowable partitioning shape may be encoded and signaled through a bitstream.

Figure 7:
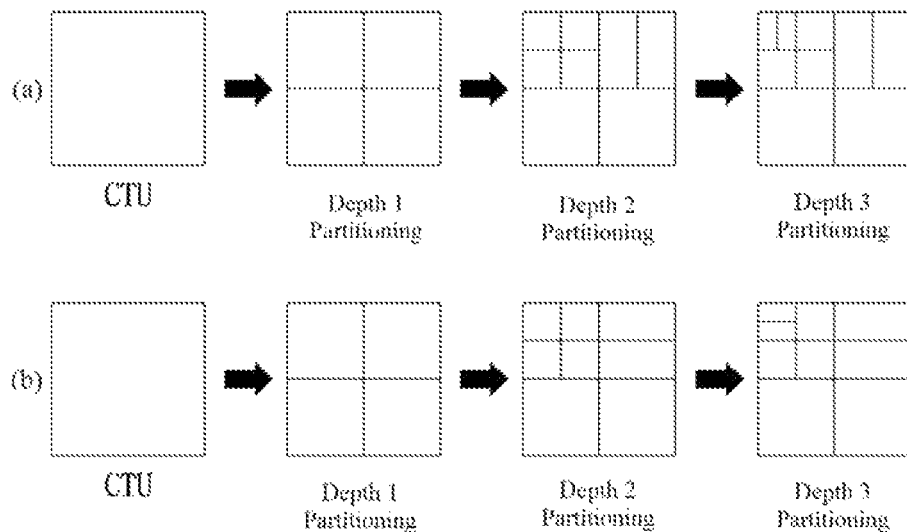
FIG. 7 is a diagram showing an example in which only a specific shape of binary tree-based partitioning is allowed.

FIG. 7 is a diagram showing an example in which only a specific shape of binary tree-based partitioning is allowed.

FIG. 7A represents an example in which only N×2N-shaped binary tree-based partitioning is allowed and FIG. 7B represents an example in which only 2N×N-shaped binary tree-based partitioning is allowed.

To represent various partitioning shapes, information on quad tree partitioning, information on binary tree partitioning or information on triple tree partitioning may be used. Information on quad tree partitioning may include at least one of information indicating whether quad tree-based partitioning is performed or information on the size/depth of a coding block in which quad tree-based partitioning is allowed. Information on binary tree partitioning may include at least one of information indicating whether binary tree-based partitioning is performed, information on whether binary tree-based partitioning is a vertical direction or a horizontal direction, information on the size/depth of a coding block in which binary tree-based partitioning is allowed or information on the size/depth of a coding block in which binary tree-based partitioning is not allowed. Information on triple tree partitioning may include at least one of information indicating whether triple tree-based partitioning is performed, information on whether triple tree-based partitioning is a vertical direction or a horizontal direction, information on the size/depth of a coding block in which triple tree-based partitioning is allowed or information on the size/depth of a coding block in which triple tree-based partitioning is not allowed. Information on the size of a coding block may represent at least one minimum value or maximum value among the width, height, product of width and height or ratio of width and height of a coding block.

In an example, when the width or height of a coding block is smaller than the minimum size in which binary tree partitioning is allowed, or when the partitioning depth of a coding block is greater than the maximum depth in which binary tree partitioning is allowed, binary tree-based partitioning may not be allowed for the coding block.

In an example, when the width or height of a coding block is smaller than the minimum size in which triple tree partitioning is allowed, or when the partitioning depth of a coding block is greater than the maximum depth in which triple tree partitioning is allowed, triple tree-based partitioning may not be allowed for the coding block.

Information on a condition that binary tree or triple tree-based partitioning is allowed may be signaled through a bitstream. The information may be encoded in a unit of a sequence, a picture or a partial image. The partial image may mean at least one of a slice, a tile group, a tile, a brick, a coding block, a prediction block or a transform block.

In an example, a syntax, 'max_mtt_depth_idx_minus1', representing the maximum depth that binary tree/triple tree partitioning is allowed may be encoded/decoded through a bitstream. In this case, max_mtt_depth_idx_minus1+1 may indicate the maximum depth that binary tree/triple tree partitioning is allowed.

In an example, at least one of the number of times that binary tree/triple tree partitioning is allowed, the maximum depth that binary tree/triple tree partitioning is allowed or the number of depths that binary tree/triple tree partitioning is allowed may be signaled in a sequence or a slice level. Accordingly, at least one of the number of times that binary tree/triple tree partitioning is allowed, the maximum depth that binary tree/triple tree partitioning is allowed or the number of depths that binary tree/triple tree partitioning is allowed may be different for a first slice and a second slice. In an example, while for the first slice, binary tree/triple tree partitioning may be allowed only in one depth, for the second slice, binary tree/triple tree partitioning may be allowed in two depths.

Figure 8:
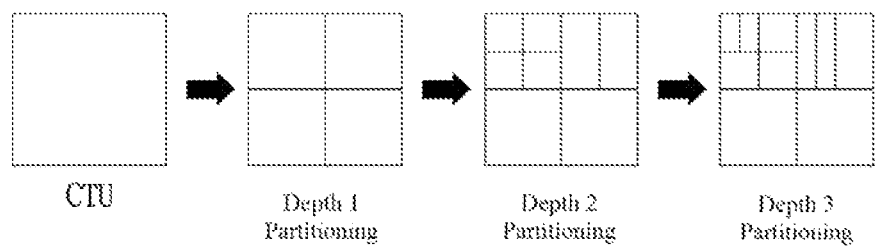
FIG. 8 is a diagram for describing an example in which information related to a number of times allowed for a binary tree partitioning is encoded/decoded according to an embodiment to which the present invention is applied.

In an example shown in FIG. 8, FIG. 8 shows that binary tree partitioning is performed for a coding unit having a depth of 2 and a coding unit having a depth of 3. Accordingly, at least one of information representing the number of times (2 times) that binary tree partitioning is performed in a coding tree unit, information representing the maximum depth (depth 3) of a partition generated by binary tree partitioning in a coding tree unit or information representing the number of partition depths (2 depths, depth 2 and depth 3) that binary tree partitioning is applied in a coding tree unit may be encoded/decoded through a bitstream.

Alternatively, the number of times that binary tree/triple tree partitioning is allowed, a depth that binary tree/triple tree partitioning is allowed or the number of depths that binary tree/triple tree partitioning is allowed may be pre-defined in an encoder and a decoder. Alternatively, the number of times that binary tree/triple tree partitioning is allowed, a depth that binary tree/triple tree partitioning is allowed or the number of depths that binary tree/triple tree partitioning is allowed may be determined based on at least one of an index of a sequence or a slice or the size/shape of a coding unit. In an example, for a first slice, binary tree/triple tree partitioning may be allowed in one depth and for a second slice, binary tree/triple tree partitioning may be allowed in two depths.

In another example, at least one of the number of times that binary tree partitioning is allowed, a depth that binary tree partitioning is allowed or the number of depths that binary tree partitioning is allowed may be set differently according to a temporal level identifier (TemporalID) of a slice or a picture. Herein, the temporal level identifier (TemporalID) is for identifying each of a plurality of layers in an image having at least one or more scalabilities of view, spatial, temporal or quality.

As shown in FIG. 4, the first coding block 300 with the partitioning depth (split depth) of k may be partitioned into multiple second coding blocks based on a quad tree. For example, the second coding blocks 310 to 340 may be a square block having the half width and height of the first coding block and the partitioning depth of the second coding block may be increased to k+1.

The second coding block 310 with the partitioning depth of k+1 may be partitioned into multiple third coding blocks with the partitioning depth of k+2. Partitioning of the second coding block 310 may be performed by selectively using one of a quad tree or a binary tree depending on a partitioning method. In this case, the partitioning method may be determined based on at least one of information indicating quad tree-based partitioning or information indicating binary tree-based partitioning.

When the second coding block 310 is partitioned based on a quad tree, the second coding block 310 may be partitioned into four third coding blocks 310a having the half width and height of the second coding block and the partitioning depth of the third coding block 310a may be increased to k+2. On the other hand, when the second coding block 310 is partitioned based on a binary tree, the second coding block 310 may be partitioned into two third coding blocks. In this case, each of two third coding blocks may be a non-square block having one of the half width and height of the second coding block and the partitioning depth may be increased to k+2. The second coding block may be determined as a non-square block in a horizontal direction or a vertical direction according to a partitioning direction and the partitioning direction may be determined based on information on whether binary tree-based partitioning is performed in a vertical direction or a horizontal direction.

Meanwhile, the second coding block 310 may be determined as a leaf coding block that is no longer partitioned based on a quad tree or a binary tree and in this case, the corresponding coding block may be used as a prediction block or a transform block.

Like partitioning of the second coding block 310, the third coding block 310a may be determined as a leaf coding block or may be further partitioned based on a quad tree or a binary tree.

On the other hand, the third coding block 310b partitioned based on a binary tree may be further partitioned into coding blocks 310b-2 in a vertical direction or coding blocks 310b-3 in a horizontal direction based on a binary tree and the partitioning depth of the corresponding coding block may be increased to k+3. Alternatively, the third coding block 310b may be determined as a leaf coding block 310b-1 that is no longer partitioned based on a binary tree and in this case, the corresponding coding block 310b-1 may be used as a prediction block or a transform block. However, the above-mentioned partitioning process may be limitedly performed based on at least one of information on the size/depth of a coding block that quad tree-based partitioning is allowed, information on the size/depth of a coding block that binary tree-based partitioning is allowed or information on the size/depth of a coding block that binary tree-based partitioning is not allowed.

The number of candidates that represent a size of a coding block may be limited to a predetermined number or a size of a coding block in a predetermined unit may have a fixed value. In an example, the size of a coding block in a sequence or in a picture may be limited to having any of 256×256, 128×128 or 32×32. Information representing the size of a coding block in a sequence or in a picture may be signaled in a sequence header or a picture header.

As a result of partitioning based on a quad tree and a binary tree, a coding unit may be represented as a square or rectangular shape in an arbitrary size.

As shown in FIG. 4, the first coding block 300 with the partitioning depth (split depth) of k may be partitioned into multiple second coding blocks based on a quad tree. For example, the second coding blocks 310 to 340 may be a square block having the half width and height of the first coding block and the partitioning depth of the second coding block may be increased to k+1.

The second coding block 310 with the partitioning depth of k+1 may be partitioned into multiple third coding blocks with the partitioning depth of k+2. Partitioning of the second coding block 310 may be performed by selectively using one of a quad tree or a binary tree depending on a partitioning method. In this case, the partitioning method may be determined based on at least one of information indicating quad tree-based partitioning or information indicating binary tree-based partitioning.

When the second coding block 310 is partitioned based on a quad tree, the second coding block 310 may be partitioned into four third coding blocks 310a having the half width and height of the second coding block and the partitioning depth of the third coding block 310a may be increased to k+2. On the other hand, when the second coding block 310 is partitioned based on a binary tree, the second coding block 310 may be partitioned into two third coding blocks. In this case, each of two third coding blocks may be a non-square block having one of the half width and height of the second coding block and the partitioning depth may be increased to k+2. The second coding block may be determined as a non-square block in a horizontal direction or a vertical direction according to a partitioning direction and the partitioning direction may be determined based on information on whether binary tree-based partitioning is performed in a vertical direction or a horizontal direction.

Meanwhile, the second coding block 310 may be determined as a leaf coding block that is no longer partitioned based on a quad tree or a binary tree and in this case, the corresponding coding block may be used as a prediction block or a transform block.

Like partitioning of the second coding block 310, the third coding block 310a may be determined as a leaf coding block or may be further partitioned based on a quad tree or a binary tree.

On the other hand, the third coding block 310b partitioned based on a binary tree may be further partitioned into coding blocks 310b-2 in a vertical direction or coding blocks 310b-3 in a horizontal direction based on a binary tree and the partitioning depth of the corresponding coding block may be increased to k+3. Alternatively, the third coding block 310b may be determined as a leaf coding block 310b-1 that is no longer partitioned based on a binary tree and in this case, the corresponding coding block 310b-1 may be used as a prediction block or a transform block. However, the above-mentioned partitioning process may be limitedly performed based on at least one of information on the size/depth of a coding block that quad tree-based partitioning is allowed, information on the size/depth of a coding block that binary tree-based partitioning is allowed or information on the size/depth of a coding block that binary tree-based partitioning is not allowed.

The number of candidates that represent a size of a coding block may be limited to a predetermined number or a size of a coding block in a predetermined unit may have a fixed value. In an example, the size of a coding block in a sequence or in a picture may be limited to having any of 256×256, 128×128 or 32×32. Information representing the size of a coding block in a sequence or in a picture may be signaled in a sequence header or a picture header.

As a result of partitioning based on a quad tree and a binary tree, a coding unit may be represented as a square or rectangular shape in an arbitrary size.

A transform skip may be set not to be used for a coding unit generated by binary tree-based partitioning or triple tree-based partitioning. Alternatively, a transform skip may be set to be applied to at least one of a vertical direction or a horizontal direction in a non-square coding unit. In an example, when a transform skip is applied to a horizontal direction, it represents only scaling is performed in a horizontal direction without transform/inverse transform and transform/inverse transform using DCT or DST is performed in a vertical direction. When a transform skip is applied to a vertical direction, it represents only scaling is performed in a vertical direction without transform/inverse transform and transform/inverse transform using DCT or DST is performed in a horizontal direction.

Information on whether inverse transform for a horizontal direction is skipped or information on whether inverse transform for a vertical direction is skipped may be signaled through a bitstream. In an example, information on whether inverse transform for a horizontal direction is skipped may be a 1-bit flag, 'hor_transform_skip_flag', and information on whether inverse transform for a vertical direction is skipped may be a 1-bit flag, 'ver_transform_skip_flag'.

An encoder may determine whether 'hor_transform_skip_flag' or 'ver_transform_skip_flag' is encoded according to the size and/or shape of a current block. In an example, when a current block has a N×2N shape, hor_transform_skip_flag may be encoded and the encoding of ver_transform_skip_flag may be omitted. When a current block has a 2N×N shape, ver_transform_skip_flag may be encoded and hor_transform_skip_flag may be omitted.

Alternatively, based on the size and/or shape of a current block, whether a transform skip for a horizontal direction is performed or whether a transform skip for a vertical direction is performed may be determined. In an example, when a current block has a N×2N shape, a transform skip may be applied to a horizontal direction and transform/inverse transform may be performed for a vertical direction. When a current block has a 2N×N shape, a transform skip may be applied to a vertical direction and transform/inverse transform may be performed for a horizontal direction. Transform/inverse transform may be performed based on at least one of DCT or DST.

As a result of partitioning based on a quad tree, a binary tree or a triple tree, a coding block which is not partitioned any more may be used as a prediction block or a transform block. In other words, a coding block generated by quad tree partitioning or binary tree partitioning may be used as a prediction block or a transform block. In an example, a prediction image may be generated in a unit of a coding block and a residual signal, a difference between an original image and a prediction image, may be transformed in a unit of a coding block. To generate a prediction image in a unit of a coding block, motion information may be determined based on a coding block or an intra prediction mode may be determined based on a coding block. Accordingly, a coding block may be encoded by using at least one of a skip mode, intra prediction or inter prediction.

Alternatively, a plurality of coding blocks generated by partitioning a coding block may be set to share at least one of motion information, a merge candidate, a reference sample, a reference sample line or an intra prediction mode. In an example, when a coding block is partitioned by a triple tree, partitions generated by partitioning the coding block may share at least one of motion information, a merge candidate, a reference sample, a reference sample line or an intra prediction mode according to the size or shape of a coding block. Alternatively, only part of a plurality of coding blocks may be set to share the information and remaining coding blocks may be set not to share the information.

In another example, it is possible to use a prediction block or a transform block smaller than a coding block by partitioning the coding block.

Hereinafter, a method of performing inter prediction for a coding block or a prediction block generated by partitioning the coding block will be described in detail.

Figure 9:
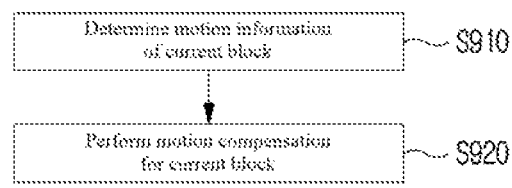
FIG. 9 is a flowchart illustrating an inter prediction method as an embodiment to which the present invention is applied.

FIG. 9 is a flowchart illustrating an inter prediction method as an embodiment to which the present invention is applied.

Referring to FIG. 9, motion information of a current block may be determined S910. The motion information of the current block may include at least one of a motion vector of the current block, a reference picture index of the current block, an inter prediction direction of the current block or a weight index of weighted prediction of the current block. The inter prediction direction of the current block indicates at least one of whether to perform prediction in the L0 direction or whether to perform prediction in the L1 direction. The weight of weighted prediction may represent a weight applying to an L0 reference block and a weight applying to an L1 reference block. The weight index of weighted prediction indicates any one of multiple weight candidates for weighted prediction.

The motion vector of the current block may be determined on the basis of information signaled through a bitstream. The precision of the motion vector represents the basic unit for expressing the motion vector of the current block. For example, the precision of motion vector of the current block may be determined to be one of an integer pel, a ½ pel, a ¼ pel, or a ⅛ pel. The precision of motion vector may be determined on a per-picture basis, a per-slice basis, a per-tile group basis, a per-tile basis, or a per-block basis. The block may represent a coding tree unit, a coding unit, a prediction unit, or a transform unit.

The motion information of the current block may be obtained based on at least one of information signaled through a bitstream or motion information of a neighboring block neighboring the current block.

Figure 10:
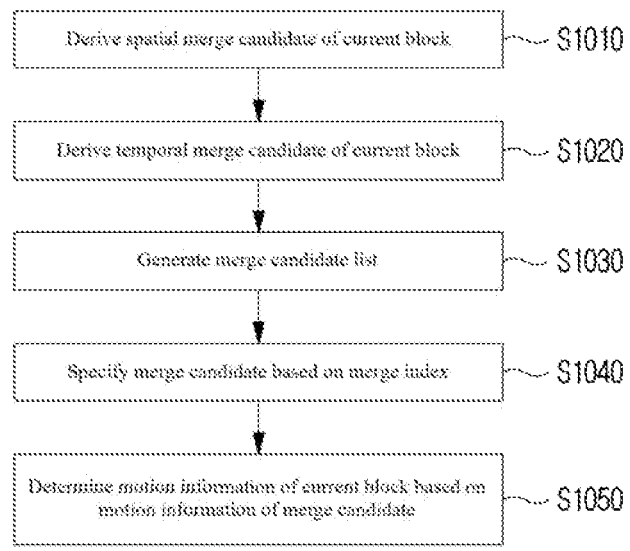
FIG. 10 is a diagram illustrating a procedure of deriving motion information of a current block when a merge mode is applied to the current block.

FIG. 10 is a diagram illustrating a procedure of deriving motion information of a current block when a merge mode is applied to the current block.

A merge mode represents a method of deriving motion information of a current block from a neighboring block.

When a merge mode is applied to a current block, a spatial merge candidate may be derived from a spatial neighboring block of a current block S1010. The spatial neighboring block may include at least one of a block adjacent to a top boundary, left boundary, or corner (e.g., at least one of a top left corner, a right top corner, or a left bottom corner) of the current block.

Figure 11:
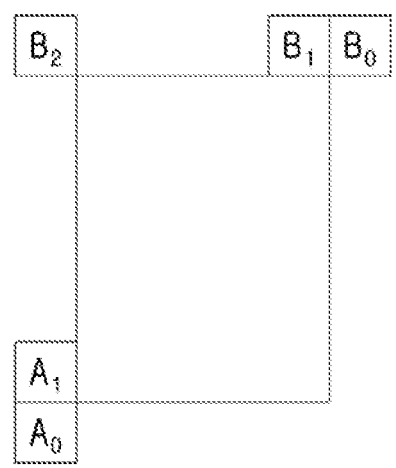
FIG. 11 is a diagram showing an example of a spatial neighboring block.

FIG. 11 is a diagram showing an example of a spatial neighboring block.

As an example shown in FIG. 11, a spatial neighboring block may include at least one of a neighboring block $A_1$ adjacent to a left of a current block, a neighboring block B1 adjacent to a top of the current block, a neighboring block $A_0$ adjacent to a bottom-left corner of the current block, a neighboring block $B_0$ adjacent to a top-right corner of the current block, and a neighboring block $B_2$ adjacent to a top-left corner of the current block. For example, let's assumed that a position of a top left corner sample of the current block is (0, 0), a width of the current block is W, and a height of the current block is H. The block $A_1$ may include a sample at position (−1, H−1). The block $B_1$ may include a sample at position (W−1, −1). The block $A_0$ may include a sample at position (−1, H). The block $B_0$ may include a sample at position (W, −1). The block $B_2$ may include a sample at position (−1, −1).

Expanding further an example of FIG. 11, a spatial merge candidate may be derived from a block adjacent to a top-left sample of a current block, or a block adjacent to a top-center sample of the current block. For example, the block neighboring to the top-left sample of the current block may include at least of a block including a sample at position (0, −1) or a block including a sample at position (−1, 0). Or, a spatial mere candidate may be derived from at least one of a block neighboring to a top-center sample of the current block or a block neighboring to a left-center sample of the current block. For example, the block neighboring to the top-center sample of the current block may include a sample at position (W/2, −1). The block neighboring to the left-center sample of the current block may include a sample at position (−1, H/2).

Based on the size and/or shape of a current block, the position of a top neighboring block and/or left neighboring block used to derive a spatial merge candidate may be determined. In an example, when the size of a current block is greater than a threshold value, spatial merge candidates may be derived from a block neighboring to the top central sample of a current block and a block neighboring to the left central sample of a current block. On the other hand, when the size of a current block is smaller than the threshold value, spatial merge candidates may be derived from a block neighboring to the top-right sample of a current block and a block neighboring to the bottom-left sample of a current block. Herein, the size of a current block may be expressed based on at least one of width, height, sum of width and height, product of width and height or a ratio of width and height. A threshold value may be an integer such as 2, 4, 8, 16, 32 or 128.

According to a shape of a current block, availability of an expanded spatial neighboring block may be determined. In an example, when a current block is a non-square block where a width is greater than a height, it may be determined that a block adjacent to a top-left sample of the current block, a block adjacent to a left-center sample, or a block adjacent to a bottom-left sample of the current block is not available. Meanwhile, when a current block is a block where a height is greater than a width, it may be determined that a block adjacent to a top-left sample of the current block, a block adjacent to a top-center sample, or a block adjacent to a top-right sample of the current block is not available.

Motion information of a spatial merge candidate may be set to be identical to motion information of a spatial neighboring block.

A spatial merge candidate may be determined by searching of neighboring blocks in a predetermined order. In an example, in an example shown in FIG. 11, searching for determining a spatial merge candidate may be performed in an order of blocks $A_1$, $B_1$, $B_0$, $A_0$, and $B_2$. Herein, a block $B_2$ may be used when at least one of remaining blocks (that is, $A_1$, $B_1$, $B_0$, and $A_0$) is not present or at least one is encoded through an intra-prediction mode.

An order of searching for a spatial merge candidate may be predefined in the encoder/decoder. Alternatively, an order of searching for a spatial merge candidate may be adaptively determined according to a size or shape of a current block. Alternatively, an order of searching for a spatial merge candidate may be determined on the basis of information signaled through a bitstream.

A temporal merge candidate may be derived from a temporal neighboring block of a current block S1020. The temporal neighboring block may mean a co-located block included in a co-located picture. The co-located picture has a POC differing from a current picture including the current block. The co-located picture may be determined as a picture having a predefined index within a reference picture list or as a picture having a POC difference with the current picture being minimum. Alternatively, the co-located picture may be determined by information signaled through a bitstream.

Information signaled through a bitstream may include at least one of information indicating a reference picture list (e.g., L0 reference picture list or L1 reference picture list) including the co-located picture and an index indicating the co-located picture within the reference picture list. Information for determining the co-located picture may be signaled in at least one of a picture parameter set, a slice header, and a block level.

Motion information on a temporal merge candidate may be determined on the basis of motion information a co-located block. In an example, a motion vector of a temporal merge candidate may be determined on the basis of a motion vector of a co-located block. For example, a motion vector of a temporal merge candidate may be set to be identical to a motion vector of a co-located block. Alternatively, a motion vector of a temporal merge candidate may be derived by scaling a motion vector of a co-located block on the basis of at least one of a POC difference between a current picture and a reference picture of the current block, and a POC difference between a co-located picture and a reference picture of the co-located.

Figure 12:
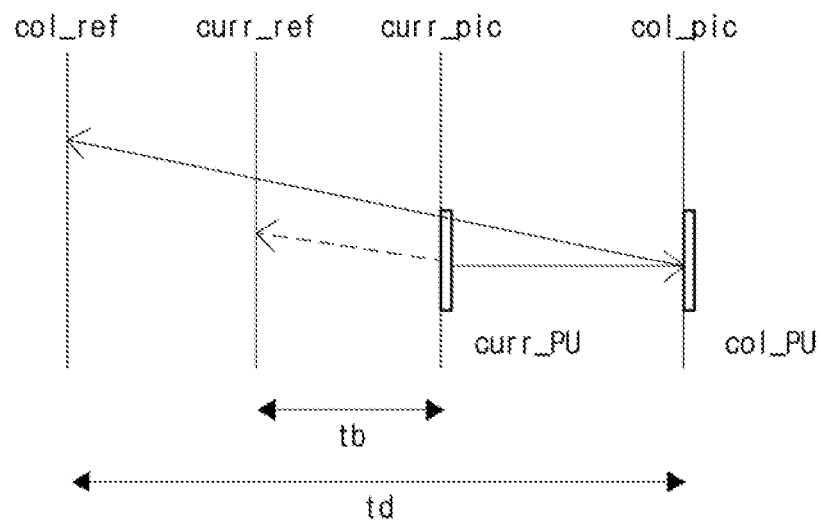
FIG. 12 is a diagram showing an example of deriving a motion vector of a temporal merge candidate.

FIG. 12 is a diagram showing an example of deriving a motion vector of a temporal merge candidate.

In an example shown in FIG. 12, tb represents a POC difference between a current picture (curr_pic) and a reference picture (curr_ref) of the current picture, and td represents a POC difference between a co-located picture col_pic and a reference picture col_ref of the co-located block. A motion vector of a temporal merge candidate may be derived by scaling a motion vector of the co-located block col_PU on the basis of tb and/or td.

Alternatively, taking into account of whether or not a co-located block is usable, a motion vector of the co-located block and a motion vector obtained by scaling the motion vector of the co-located block may be used as a motion vector of a temporal merge candidate. In an example, a motion vector of a co-located block is set as a motion vector of a first temporal merge candidate, and a value obtained by scaling the motion vector of the co-located block may be set as a motion vector of a second temporal merge candidate.

An inter-prediction direction of a temporal merge candidate may be set to be identical to an inter-prediction direction of a temporal neighboring block. However, a reference picture index of the temporal merge candidate may have a fixed value. In an example, a reference picture index of a temporal merge candidate may be set to "0". Alternatively, a reference picture index of a temporal merge candidate may be adaptively determined on the basis of at least one of a reference picture index of a spatial merge candidate, a reference picture index of a current picture.

A specific block having the same position and size with a current block within a co-located picture, or a block adjacent to a block adjacent to a block having the same position and size with the current block may be determined as a co-located block.

Figure 13:
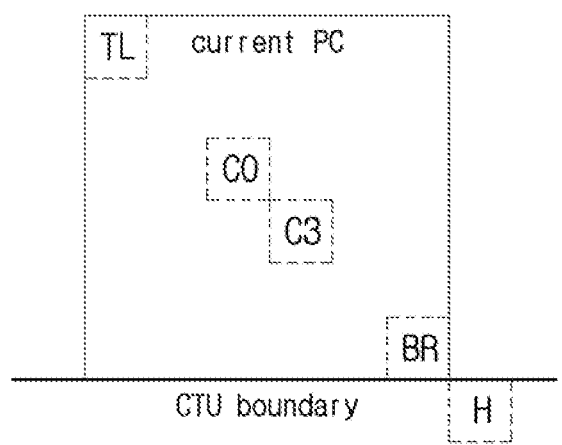
FIG. 13 is a diagram showing a position of candidate blocks that are possibly used as a co-located block.

FIG. 13 is a diagram showing a position of candidate blocks that are possibly used as a co-located block.

A candidate block may include at least one of a block adjacent to a position of a top-left corner of a current block within a co-located picture, a block adjacent to a position of a center sample of the current block within the co-located picture, and a block adjacent to a position of a bottom-left corner of the current block within the co-located picture.

In an example, a candidate block may include at least one of a block TL including a position of a top-left sample of a current block within a co-located picture, a block BR including a position of a bottom-right sample of the current block within the co-located picture, a block H adjacent to a bottom-right corner of the current block within the co-located picture, a block C3 including a position of a center sample of the current block within the co-located picture, and a block C0 adjacent to the center sample of the current block (for example, a block including a position of a sample spaced apart from the center sample of the current block by (−1, −1)) within the co-located picture.

In addition to the example shown in FIG. 13, a block including a position of a neighboring block adjacent to a predetermined boundary of a current block within the co-located picture may be selected as a co-located block.

The number of temporal merge candidates may be 1 or more. In an example, at least one temporal merge candidate may be derived on the basis of at least one co-located block.

Information on the maximum number of temporal merge candidates may be encoded and signaled through the encoder. Alternatively, the maximum number of temporal merge candidates may be derived on the basis of the maximum number of merge candidates and/or the maximum number of spatial merge candidates which are possible included in a merge candidate list. Alternatively, the maximum number of temporal merge candidates may be determined on the basis of the number of usable co-located blocks.

Whether or not candidate blocks are usable may be determined according to a predetermined priority, and at least one co-located block may be determined on the basis of the above determination and the maximum number of temporal merge candidates. In an example, when a block C3 including a position of a center sample of a current block and a block H adjacent to a bottom-right corner of the current block are candidate blocks, any one of the block C3 and the block H may be determined as a co-located block. When the block H is available, the block H may be determined as a co-located block. However, when the block H is not available (for example, when the block H is encoded through intra-prediction, when the block H is not usable or when the block H is positioned outside of the largest coding unit (LCU), etc.), a block C3 may be determined as a co-located block.

In another example, when at least one of a plurality of blocks adjacent to a bottom-right corner position of a current block within a co-located picture is unavailable (for example, a block H and/or a block BR), the unavailable block may be replaced with another available block. Another available block that is replaced with a unavailable block may include at least one a block (for example, C0 and/or C3) adjacent to a center sample position of a current block within a co-located picture, and a block (for example, TL) adjacent to a bottom-left corner of the current block with the co-located picture.

When at least one of a plurality of blocks adjacent to a center sample position of a current block within a co-located picture is unavailable or when at least one of a plurality of blocks adjacent to a top-left corner position of the current block within the co-located picture is unavailable, the unavailable block may be replaced with another available block.

Subsequently, a merge candidate list including the spatial merge candidate and the temporal merge candidate may be generated S1030. When configuring a merge candidate list, a merge candidate having motion information identical with an existing merge candidate may be removed from the merge candidate list.

Information on the maximum number of merge candidates may be signaled through a bitstream. In an example, information indicating the maximum number of merge candidates may be signaled through a sequence parameter or picture parameter. In an example, when the maximum number of merge candidates is six, a total of six may be selected from spatial merge candidates and temporal merge candidates. For example, five spatial merge candidates may be selected from five merge candidates, and one temporal merge candidate may be selected from two temporal merge candidates.

Alternatively, the maximum number of merge candidates may be predefined in the encoder and the decoder. For example, the maximum number of merge candidates may be two, three, four, five, or six. Alternatively, the maximum number of merge candidates may be determined based on at least one of whether merge with MVD (MMVD) is performed, whether combined prediction is performed, or whether triangular partitioning is performed.

If the number of merge candidates included in a merge candidate list is smaller than the maximum number of merge candidates, a merge candidate included in a second merge candidate list may be added to the merge candidate list.

The second merge candidate list may include a merge candidate derived based on the motion information of a block encoded/decoded by inter prediction before a current block. In an example, if motion compensation for a block whose an encoding mode is inter prediction is performed, a merge candidate derived based on the motion information of the block may be added to the second merge candidate list. If encoding/decoding of a current block is completed, the motion information of a current block may be added to the second merge candidate list for the inter prediction of the subsequent block.

The second merge candidate list may be initialized in a unit of a CTU, a tile or a slice. The maximum number of merge candidates which may be included in the second merge candidate list may be predefined in an encoder and a decoder. Alternatively, information representing the maximum number of merge candidates which may be included in the second merge candidate list may be signaled through a bitstream.

The indexes of merge candidates included in the second merge candidate list may be determined based on the order added to the second merge candidate list. In an example, an index assigned to a N-th merge candidate added to the second merge candidate list may have a value smaller than an index assigned to a N+1-th merge candidate added to the second merge candidate list. For example, an index of the N+1-th merge candidate may be set to be a value increased by 1 to an index of the N-th merge candidate. Alternatively, an index of the N-th merge candidate may be set to be an index of the N+1-th merge candidate and the value of an index of the N-th merge candidate may be subtracted by 1.

Alternatively, an index assigned to the N-th merge candidate added to the second merge candidate list may have a value larger than an index assigned to the N+1-th merge candidate added to the second merge candidate list. For example, an index of the N-th merge candidate may be set to be an index of the N+1-th merge candidate and the value of an index of the N-th merge candidate may be increased by 1.

Based on whether motion information of a block that motion compensation is performed is the same as motion information of a merge candidate included in the second merge candidate list, whether a merge candidate derived from the block is added to the second merge candidate list may be determined. In an example, when a merge candidate with the same motion information as the block is included in the second merge candidate list, a merge candidate derived based on the motion information of the block may not be added to the second merge candidate list. Alternatively, when a merge candidate with the same motion information as the block is included in the second merge candidate list, the merge candidate may be deleted from the second merge candidate list and a merge candidate derived based on the motion information of the block may be added to the second merge candidate list.

When the number of merge candidates included in the second merge candidate list is the same as the maximum number of merge candidates, a merge candidate with the lowest index or a merge candidate with the highest index may be deleted from the second merge candidate list and a merge candidate derived based on the motion information of the block may be added to the second merge candidate list. In other words, after deleting the oldest merge candidate among merge candidates included in the second merge candidate list, a merge candidate derived based on the motion information of the block may be added to the second merge candidate list.

When the number of merge candidates included in a merge candidate list does not reach the maximum number of merge candidates yet, a combined merge candidate obtained by combining two or more merge candidates or a merge candidate having a (0,0) motion vector (zero motion vector) may be included in the merge candidate list.

Alternatively, an average merge candidate striking an average of a motion vector of two or more merge candidates may be added to a merge candidate list. An average merge candidate may be derived by striking an average of a motion vector of two or more merge candidates included in a merge candidate list. In an example, when a first merge candidate and a second merge candidate are added to a merge candidate list, an average of a motion vector of the first merge candidate and a motion vector of the second merge candidate may be calculated so as to obtain an average merge candidate. In detail, an L0 motion vector of an average merge candidate may be derived by calculating an average of an L0 motion vector of the first merge candidate and an L0 motion vector of the second merge candidate, and an L1 motion vector of the average merge candidate may be derived by calculating an average of an L1 motion vector of the first merge candidate and an L1 motion vector of the second merge candidate. When bi-directional prediction is applied to any one of a first merge candidate and a second merge candidate, and uni-directional prediction is performed to the other one, a motion vector of the bi-directional merge candidate may be set as it is to an L0 motion vector or L1 motion vector of an average merge candidate. In an example, when L0 directional and L1 directional predictions are performed on a first merge candidate, but L0 directional prediction is performed on a second merge candidate, an L0 motion vector of an average merge candidate may be derived by calculating an average of an L0 motion vector of the first merge candidate and an L0 motion vector of the second merge candidate. Meanwhile, an L1 motion vector of the average merge candidate may be derived as an L1 motion vector of the first merge candidate.

When a reference picture of a first merge candidate differs with a second merge candidate, a motion vector of the first merge candidate or second merge candidate may be scaled according to a distance (that is, POC difference) between reference pictures of respective merge candidates and a current picture. For example, after scaling a motion vector of a second merge candidate, an average merge candidate may be derived by calculating an average of a motion vector of a first merge candidate and the scaled motion vector of the second merge candidate. Herein, priorities may be set on the basis of a value of a reference picture index of each merge candidate, a distance between a reference picture of each merge candidate and a current block, or whether or not bi-directional prediction is applied, and scaling may be applied to a motion vector of a merge candidate having high (or low) priority.

A reference picture index of an average merge candidate may be set to indicate a reference picture at a specific position within a reference picture list. In an example, a reference picture index of an average merge candidate may indicate the first or last reference picture within a reference picture list. Alternatively, a reference picture index of an average merge candidate may be set to be identical to a reference picture index of a first merge candidate or second merge candidate. In an example, when a reference picture index of a first merge candidate is identical with a second merge candidate, a reference picture index of an average merge candidate may be set to be identical to a reference picture index of the first merge candidate and the second merge candidate. When a reference picture index of a first merge candidate differs with a second merge candidate, priorities may be set on the basis of a value of a reference picture index of each merge candidate, a distance between a reference picture of each merge candidate with the current block, or whether or not bi-directional prediction is applied, and a reference picture index of a merge candidate with high (or low) priority may be set as a reference picture index of an average merge candidate. In an example, when bi-directional prediction is applied to a first merge candidate, and uni-directional prediction is applied to a second merge candidate, a reference picture index of the first merge candidate to which bi-directional prediction is applied may be determined as a reference picture index of an average merge candidate.

On the basis of priorities between combinations of merge candidates, the sequence of the combinations for generating an average merge candidate may be determined. The priorities may be predefined in the encoder and the decoder. Alternatively, the sequence of the combinations may be determined on the basis of whether bi-directional prediction of a merge candidate is performed. For example, a combination of merge candidates encoded using bi-directional prediction may be set to have a higher priority that a combination of merge candidates encoded using uni-directional prediction. Alternatively, the sequence of the combinations may be determined on the basis of a reference picture of a merge candidate. For example, a combination of merge candidates having the same reference picture may have a higher priority than a combination of merge candidates having different reference pictures.

A merge candidate may be included in a merge candidate list according to predefined priority. A merge candidate with high priority may be assigned with a small index value. In an example, a spatial merge candidate may be added to a merge candidate list before than a temporal merge candidate. In addition, spatial merge candidates may be added to a merge candidate list in an order of a spatial merge candidate of a left neighboring block, a spatial merge candidate of a top neighboring block, a spatial merge candidate of a block adjacent to a top-right corner, a spatial merge candidate of a block adjacent to a bottom-left corner, and a spatial merge candidate of a block adjacent to atop-left corner. Alternatively, it may be set such that a spatial merge candidate derived from a neighboring block adjacent to a top-left corner of a current block (B2 of FIG. 11) is added to a merge candidate list later than a temporal merge candidate.

In another example, priorities between merge candidates may be determined according to a size or shape of a current block. In an example, when a current block has a rectangle shape where a width is greater than a height, a spatial merge candidate of a left neighboring block may be added to a merge candidate list before than a spatial merge candidate of a top neighboring block. On the other hand, when a current block has a rectangle shape where a height is greater than a width, a spatial merge candidate of a top neighboring block may be added to a merge candidate list before than a spatial merge candidate of a left neighboring block.

In another example, priorities between merge candidates may be determined according to motion information of respective merge candidates. In an example, a merge candidate having bi-directional motion information may have priority higher than a merge candidate having uni-directional motion information. Accordingly, a merge candidate having bi-directional motion information may be added to a merge candidate list before than a merge candidate having uni-directional motion information.

In another example, a merge candidate list may be generated according to predefined priority, and then merge candidates may be rearranged. Rearranging may be performed on the basis of motion information of merge candidates. In an example, rearranging may be performed on the basis of whether or not a merge candidate has bi-directional motion information, a size of a motion vector, precision of a motion vector, or a POC difference between a current picture and a reference picture of a merge candidate. In detail, a merge candidate having bi-directional motion information may be rearranged to have priority higher than a merge candidate having uni-directional motion information. Alternatively, a merge candidate having a motion vector with a precision value of a fractional-pel may be rearranged to have priority higher than a merge candidate having a motion vector with a precision of an integer-pel.

When the merge candidate list is generated, at least one of merge candidates included in the merge candidate list may be specified on the basis of a merge candidate index S1040.

Motion information of the current block may be set to be identical to motion information of the merge candidate specified by the merge candidate index S1050. In an example, when a spatial merge candidate is selected by the merge candidate index, motion information of the current block may be set to be identical to motion information of the spatial neighboring block. Alternatively, when a temporal merge candidate is selected by the merge candidate index, motion information of the current block may be set to be identical to motion information of the temporal neighboring block.

As the coding unit is divided, a plurality of partitions may exist in one coding unit. The partition may be a coding unit, a prediction unit, or a transform unit. The plurality of partitions may be generated by applying quad tree partitioning, binary tree partitioning, triple tree partitioning, or triangular partitioning to the coding unit. A partition may be square, non-square, or triangular. A derivation order of a merge candidate between a plurality of partitions may follow a priority or a predetermined order between partitions. The priority or predetermined order may be determined based on at least one of an encoding/decoding order, a block scan order, a raster scan order, a size, a shape, a partition index, or a position of the partitions. For example, the derivation order of a merge candidate may be determined based on an encoding/decoding order. As an example, a partition having an earlier encoding/decoding order may derive a merge candidate before a partition having a later encoding/decoding order. In the exemplary embodiment described below, a partition having an earlier derivation order of a merge candidate is referred to as a first partition, and a partition having a later derivation order of a merge candidate is referred to as a second partition.

A plurality of partitions may sequentially derive a merge candidate. In this case, the merge candidate of the second partition may be determined in consideration of motion information, a merge candidate, or a merge index of the first partition. As an example, a merge candidate used to derive motion information of the first partition (i.e., a merge candidate indicated by the merge index of the first partition) may be set not to be used as a merge candidate of the second partition. Specifically, the merge candidate used to derive motion information of the first partition may be determined to be unavailable as a merge candidate of the second partition.

Alternatively, a merge candidate having the same motion information as the motion information of the first partition among the merge candidates of the second coding unit may be set not to be used as the merge candidate of the second coding unit. Specifically, a merge candidate having the same motion information as the motion information of the first partition may be determined to be unavailable as a merge candidate of the second partition.

Figure 14:
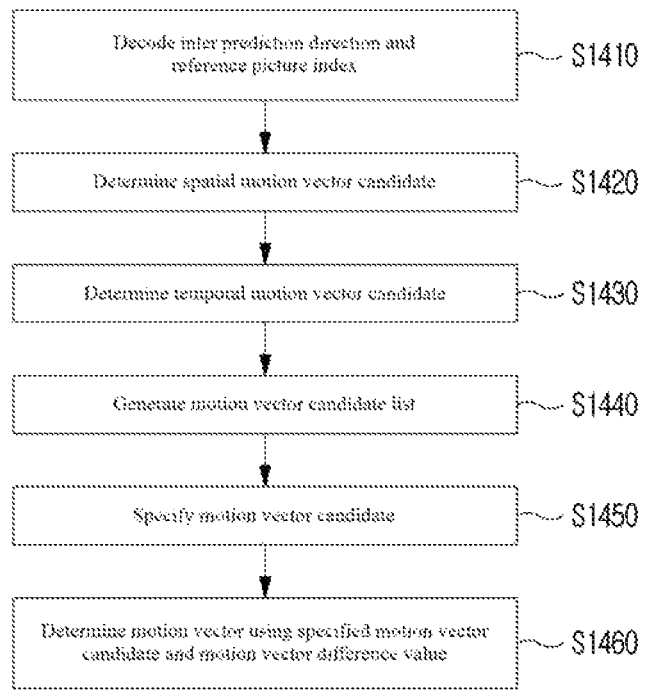
FIG. 14 is a diagram showing a process of deriving motion information of a current block when an AMVP mode is applied to the current block.

FIG. 14 is a diagram showing a process of deriving motion information of a current block when an AMVP mode is applied to the current block.

When an AMVP mode is applied to a current block, at least one of an inter-prediction direction of the current block, and a reference picture index may be decoded from a bitstream S1410. In other words, when an AMVP mode is applied, at least one of an inter-prediction direction of the current block, and a reference picture index may be determined on the basis of information encoded through a bitstream.

A spatial motion vector candidate may be determined on the basis of a motion vector of a spatial neighboring block of the current block S1420. The spatial motion vector candidate may include at least one of a first spatial motion vector candidate derived from a top neighboring block of the current block, and a second spatial motion vector candidate derived from a left neighboring block of the current block. Herein, the top neighboring block may include at least one of blocks adjacent to a top and a top-right corner of the current block, and the left neighboring block of the current block includes at least one of blocks adjacent to a left and a left-bottom corner of the current block. The block adjacent to the left-top corner of the current block may be used as the top neighboring block or may be used as the left neighboring block.

Alternatively, a spatial motion vector candidate may be derived from a spatial non-neighboring block that is not adjacent to a current block. In an example, a spatial motion vector candidate of a current block may be derived by using at least one of: a block positioned at the same vertical line with a block adjacent to atop, top-right corner, or top-left corner of the current block; a block positioned at the same horizontal line with a block adjacent to a left, bottom-left corner, or top-left corner of the current block; and a block positioned at the same diagonal line with a block adjacent to a corner of the current block. When a spatial neighboring block is not available, a spatial motion vector candidate may be derived by using a spatial non-neighboring block.

In another example, at least two spatial motion vector candidates may be derived by using a spatial neighboring block and spatial non-neighboring blocks. In an example, a first spatial motion vector candidate and a second spatial motion vector candidate may be derived by using neighboring blocks adjacent to a current block. Meanwhile, a third spatial motion vector candidate and/or a fourth spatial motion vector candidate may be derived on the basis of blocks that are not adjacent to the current block but adjacent to the above neighboring blocks.

When the current block differs in a reference picture with the spatial neighboring block, a spatial motion vector may be obtained by performing scaling for a motion vector of the spatial neighboring block. A temporal motion vector candidate may be determined on the basis of a motion vector of the temporal neighboring block of the current block S1430. When the current block differs in a reference picture with the temporal neighboring block, a temporal motion vector may be obtained by performing scaling on a motion vector of the temporal neighboring block. Herein, when the number of spatial motion vector candidates is equal to or smaller than a predetermined number, a temporal motion vector candidate may be derived.

A motion vector candidate list including the spatial motion vector candidate and the temporal motion vector candidate may be generated S1440.

When the motion vector candidate list is generated, at least one of motion vector candidates included in the motion vector candidate list may be specified on the basis of information specifying at least one of the motion vector candidate list S1450.

The motion vector candidate specified by the information may be set as a prediction value of a motion vector of the current block, and the motion vector of the current block may be obtained by adding a residual value of a motion vector to the prediction value of the motion vector S1460. Herein, the residual value of the motion vector may be parsed through a bitstream.

When the motion information of the current block is obtained, motion compensation for the current block may be performed on the basis of the obtained motion information S920. In detail, motion compensation for the current block may be performed on the basis of an inter-prediction direction, a reference picture index, and a motion vector of the current block. An inter prediction direction represents whether a L0-prediction, a L1-prediction or a bi-prediction is performed. When a current block is encoded by a bi-prediction, the prediction block of a current block may be obtained based on the weighted sum operation or average operation of a L0 reference block and a L1 reference block.

When a prediction sample is obtained by performing motion compensation, the current block may be reconstructed on the basis of the generated prediction sample. In detail, a reconstructed sample may be obtained by adding a prediction sample of a current block and a residual sample.

As in the above-described example, on the basis of motion information of the block encode/decoded using inter prediction before the current block, a merge candidate of the current block may be derived. For example, on the basis of motion information of a neighboring block at a predefined position adjacent to the current block, a merge candidate of the current block may be derived. Examples of the neighboring block may include at least one among a block adjacent to the left of the current block, a block adjacent to the top of the current block, a block adjacent to the top left corner of the current block, a block adjacent to the top right corner of the current block, and a block adjacent to the bottom left corner of the current block.

A merge candidate of the current block may be derived on the basis of motion information of a block other than the neighboring block. For convenience of description, a neighboring block at a predefined position adjacent to the current block is referred to as a first merge candidate block, and a block at a different position from the first merge candidate block is referred to as a second merge candidate block.

Figure 15:
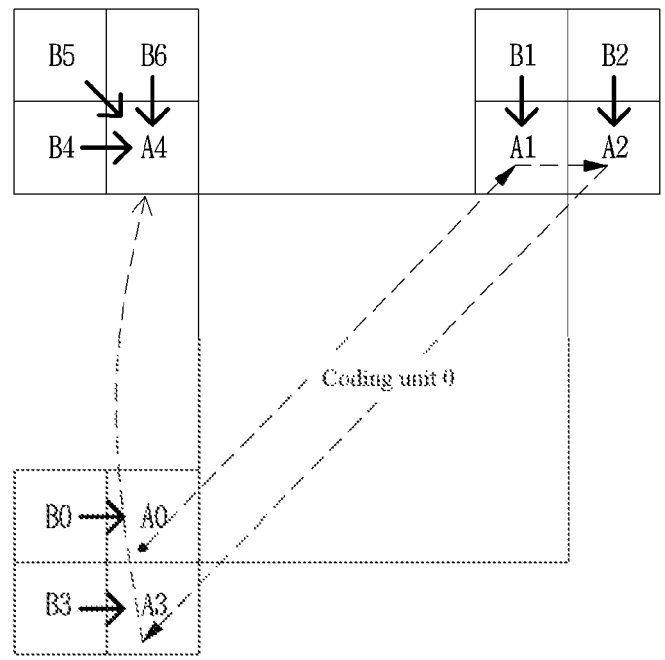
FIG. 15 is a diagram illustrating an example of deriving a merge candidate from a second merge candidate block when a first merge candidate block is unavailable.
Figure 16:
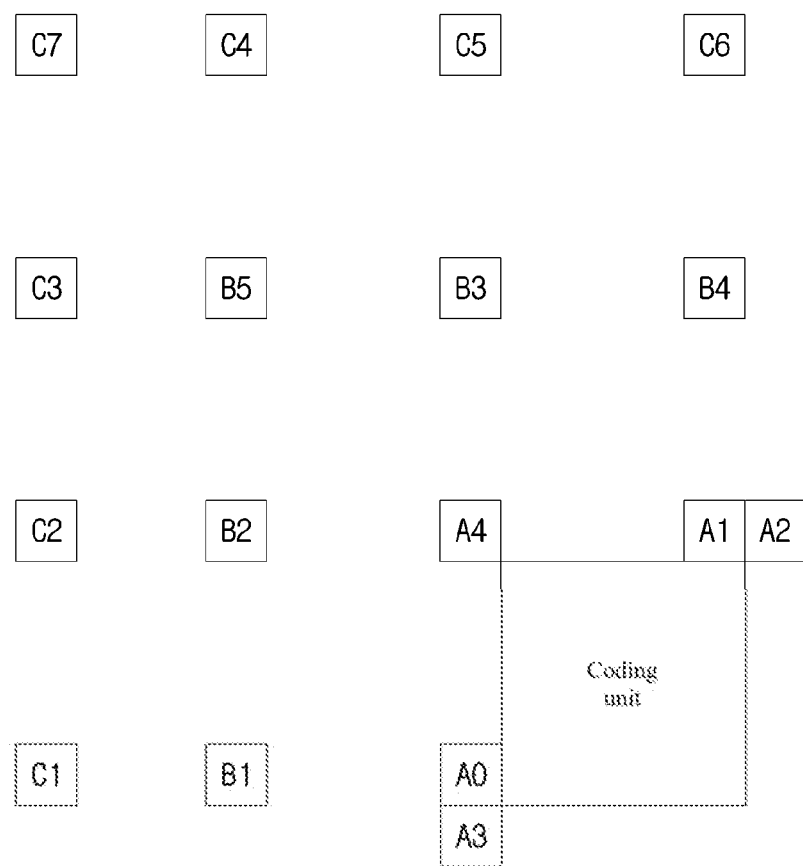
FIG. 16 is a diagram illustrating an example of deriving a merge candidate from a second merge candidate block positioned on the same line as a first merge candidate block.
Figure 17:
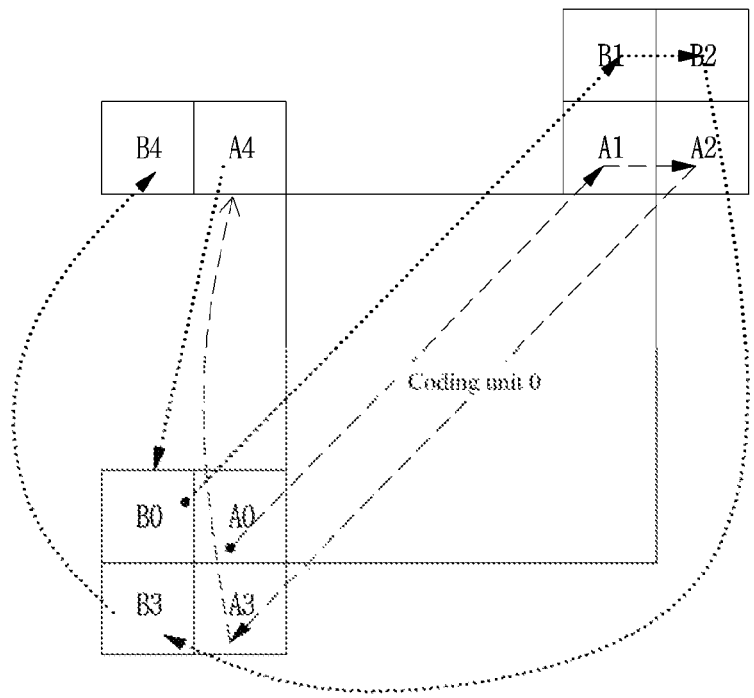
FIGS. 17 to 20 are diagrams illustrating the order of searching for merge candidate blocks.

The second merge candidate block may include at least one of a block encoded/decoded using inter prediction before a current block, a block adjacent to the first merge candidate block or a block positioned on the same line as the first merge candidate block. FIG. 15 shows the second merge candidate block adjacent to the first merge candidate block and FIG. 16 shows the second merge candidate block positioned on the same line as the first merge candidate block.

When the first merge candidate block is unavailable, a merge candidate derived on the basis of motion information of the second merge candidate block is added to a merge candidate list. Alternatively, even though at least one among a spatial merge candidate and a temporal merge candidate is added to a merge candidate list, when the number of merge candidates included in the merge candidate list is smaller than the maximum number of merge candidates, a merge candidate derived on the basis of motion information of the second merge candidate block is added to the merge candidate list.

FIG. 15 is a diagram illustrating an example of deriving a merge candidate from a second merge candidate block when a first merge candidate block is unavailable.

When a first merge candidate block AN (herein, N ranges from 0 to 4) is unavailable, a merge candidate of the current block is derived on the basis of motion information of a second merge candidate block BM (herein, M ranges from 0 to 6). That is, a merge candidate of the current block may be derived by replacing the unavailable first merge candidate block with the second merge candidate block.

Among the blocks adjacent to the first merge candidate block, the block placed in a predefined direction from the first merge candidate block may be set as a second merge candidate block. The predefined direction may be a leftward direction, a rightward direction, an upward direction, a downward direction, or a diagonal direction. The predefine direction may be set for each first merge candidate block. For example, a predefined direction of the first merge candidate block adjacent to the left of the current block may be a leftward direction. A predefined direction of the first merge candidate block adjacent to the top of the current block may be an upward direction. A predefined direction of the first merge candidate block adjacent to the corner of the current block may include at least one of a leftward direction, an upward direction, or a diagonal direction.

For example, when A0 adjacent to the left of the current block is unavailable, a merge candidate of the current block is derived on the basis of B0 adjacent to A1. When A1 adjacent to the top of the current block is unavailable, a merge candidate of the current block is derived on the basis of B1 adjacent to A1. When A2 adjacent to the top right corner of the current block is unavailable, a merge candidate of the current block is derived on the basis of B2 adjacent to A2. When A3 adjacent to the bottom left corner of the current block is unavailable, a merge candidate of the current block is derived on the basis of B3 adjacent to A3. When A4 adjacent to the top left corner of the current block is unavailable, a merge candidate of the current block is derived on the basis of at least one among B4 to B6 adjacent to A4.

The example shown in FIG. 15 is only for describing an embodiment of the present invention, and does not limit the present invention. A position of the second merge candidate block may be set different from the sample shown in FIG. 15. For example, the second merge candidate block adjacent to the first merge candidate block adjacent to the left of the current block may be positioned in an upward direction or downward direction of the first merge candidate block. Alternatively, the second merge candidate block adjacent to the first merge candidate block adjacent to the top of the current block may be positioned in a leftward direction or rightward direction of the first merge candidate block.

FIG. 16 is a diagram showing an example of deriving a merge candidate from the second merge candidate block positioned on the same line as the first merge candidate block.

A block positioned on the same line as the first merge candidate block may include at least one of a block positioned on the same horizontal line as the first merge candidate block, a block positioned on the same vertical line as the first merge candidate block or a block positioned on the same diagonal line as the first merge candidate block. The y-coordinate position of blocks positioned on the same horizontal line are the same. The x-coordinate position of blocks positioned on the same vertical line are the same. A difference value between the x-coordinate positions of blocks positioned on the same diagonal line is the same as a difference value between the y-coordinate positions.

Figure 18:
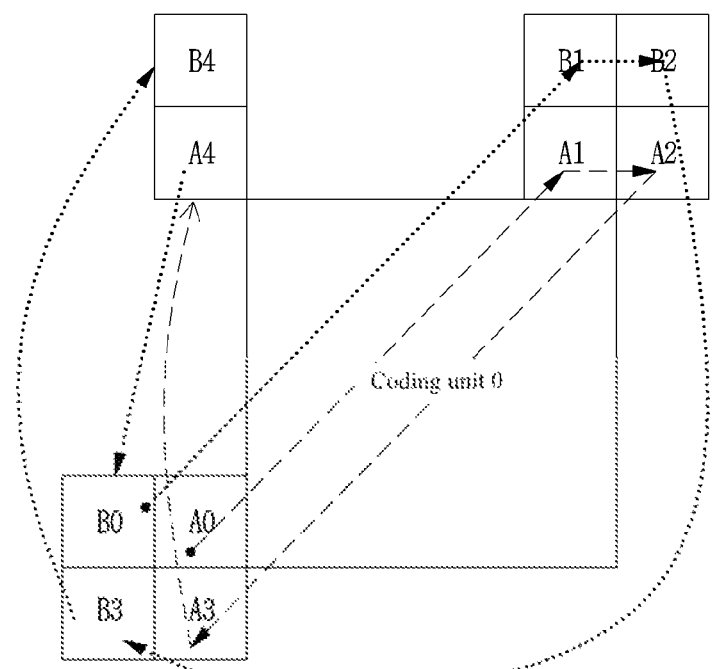
Figure 19:
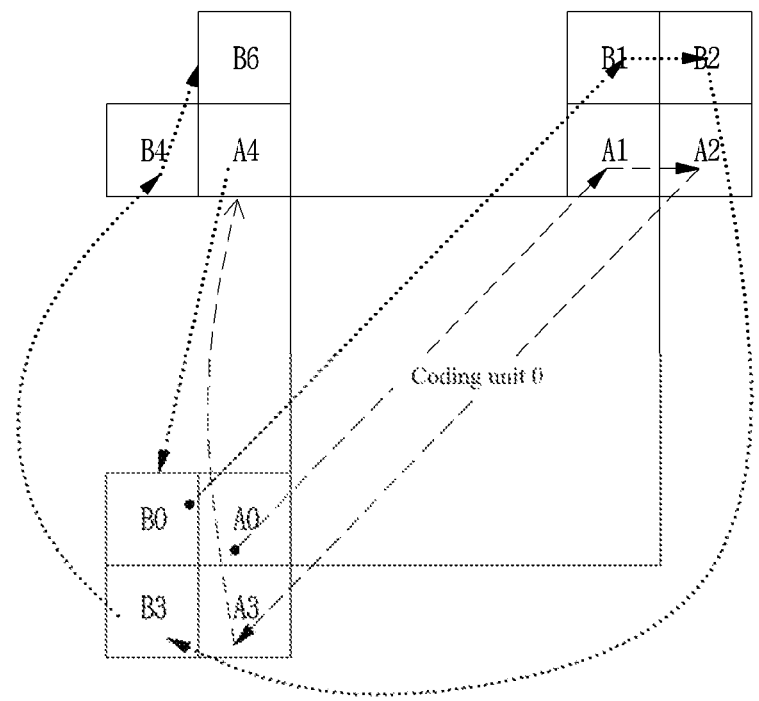
Figure 20:
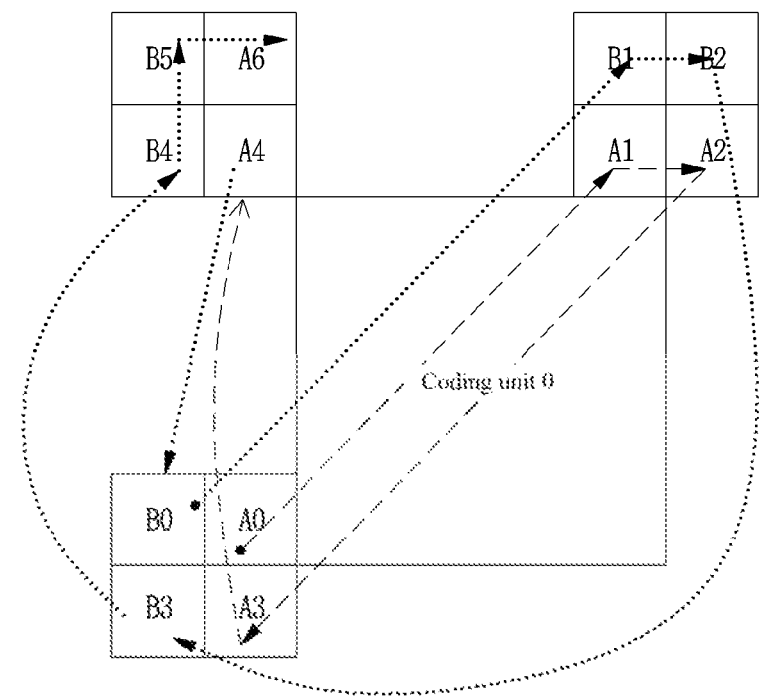

It is assumed that the top-left sample of a current block is positioned at (0,0) and the width and height of a current block is W and H, respectively. In FIG. 18, it was shown that the position of the second merge candidate blocks (e.g., B4, C6) positioned on the same vertical line as the first merge candidate block is determined based on a rightmost block at the top of a coding block (e.g., a block A1 including a coordinate (W−1, −1)). In addition, in FIG. 18, it was shown that the position of the second merge candidate blocks (e.g., B1, C1) positioned on the same horizontal line as the first merge candidate block is determined based on the lowest block at the left of a coding block (e.g., a block A0 including a coordinate (−1, H−1)).

In another example, the position of the second merge candidate blocks may be determined based on the leftmost block at the top of a coding block (e.g., a block including a coordinate (0, −1)) or a block positioned at the top center of a coding block (e.g., a block including a coordinate (W/2, −1)). In addition, the position of the second merge candidate blocks may be determined based on the topmost block at the left of a coding block (e.g., a block including a coordinate (−1, 0)) or a block positioned at the left center of a coding block (e.g., a block including a coordinate (−1, H/2)).

In another example, when there are a plurality of top neighboring blocks adjacent to the top of a current block, the second merge candidate block may be determined by using all or some of a plurality of top neighboring blocks. In an example, the second merge candidate block may be determined by using a block at a specific position (e.g., at least one of a top neighboring block positioned at the leftmost side, a top neighboring block positioned at the rightmost side or a top neighboring block positioned at the center) among a plurality of top neighboring blocks. The number of top neighboring blocks used to determine the second merge candidate block among a plurality of top neighboring blocks may be 1, 2, 3 or more. In addition, when there are a plurality of left neighboring blocks adjacent to the left of a current block, the second merge candidate block may be determined by using all or some of a plurality of left neighboring blocks. In an example, the second merge candidate block may be determined by using a block at a specific position (e.g., at least one of a left neighboring block positioned at the bottommost side, a left neighboring block positioned at the topmost side or a left neighboring block positioned at the center) among a plurality of left neighboring blocks. The number of left neighboring blocks used to determine the second merge candidate block among a plurality of left neighboring blocks may be 1, 2, 3 or more.

According to the size and/or shape of a current block, the position and/or number of top neighboring blocks and/or left neighboring blocks used to determine the second merge candidate block may be differently determined. In an example, when the size of a current block is greater than a threshold value, the second merge candidate block may be determined based on a top center block and/or a left center block. On the other hand, when the size of a current block is smaller than a threshold value, the second merge candidate block may be determined based on a top rightmost block and/or a left bottommost block. A threshold value may be an integer such as 8, 16, 32, 64 or 128.

The first merge candidate list and the second merge candidate list may be constructed and motion compensation of the current block may be performed based on at least one of the first merge candidate list or the second merge candidate list.

The first merge candidate list may include at least one of a spatial merge candidate derived on the basis of motion information of a neighboring block at a predefined position adjacent to the current block, or a temporal merge candidate derived on the basis of motion information of a co-located block.

The second merge candidate list may include a merge candidate derived on the basis of the motion information of the second merge candidate block.

As an embodiment of the present invention, the first merge candidate list may be constructed including a merge candidate derived from the first merge candidate block, and the second merge candidate list may be constructed including a merge candidate derived from the second merge candidate block. In an example, in the example shown in FIG. 15, merge candidates derived from blocks A0 to A4 may be added to the first merge candidate list, and merge candidates derived from blocks B0 to B6 may be added to the second merge candidate list. In an example, in the example shown in FIG. 16, merge candidates derived from blocks A0 to A4 may be added to the first merge candidate list and merge candidates derived from blocks B0 to B5, C0 to C7 may be added to the second merge candidate list.

Alternatively, the second merge candidate list may include a merge candidate derived on the basis of motion information of a block that is encoded/decoded using inter prediction before the current block. For example, when motion compensation for a block of which an encoding mode is inter prediction is performed, a merge candidate derived on the basis of motion information of the block is added to the second merge candidate list. When encoding/decoding of the current block is completed, motion information of the current block is added to the second merge candidate list for inter prediction of the subsequent block.

Indexes of the merge candidates included in the second merge candidate list may be determined on the basis of the order in which the merge candidates are added to the second merge candidate list. For example, an index allocated to the N-th merge candidate added to the second merge candidate list may have a lower value than an index allocated to the N+1-th merge candidate added to the second merge candidate list. For example, an index of the N+1-th merge candidate may be set to have a higher value by one than an index of the N-th merge candidate. Alternatively, an index of the N-th merge candidate may be set to an index of the N+1-th merge candidate, and a value of the index of the N-th merge candidate subtract is decreased by one.

Alternatively, an index allocated to the N-th merge candidate added to the second merge candidate list may have a higher value than an index allocated to the N+1-th merge candidate added to the second merge candidate list. For example, an index of the N-th merge candidate may be set to an index of the N+1-th merge candidate, and a value of the index of the N-th merge candidate subtract is increased by one.

On the basis of whether motion information of a block subjected to motion compensation is the same as motion information of the merge candidate included in the second merge candidate list, it may be determined whether to add a merge candidate derived from the block to the second merge candidate list. For example, when the merge candidate having the same motion information as the block is included in the second merge candidate list, a merge candidate derived on the basis of the motion information of the block is not added to the second merge candidate list. Alternatively, when the merge candidate having the same motion information as the block is included in the second merge candidate list, the merge candidate is deleted from the second merge candidate list and a merge candidate derived on the basis of the motion information of the block is added to the second merge candidate list.

When the number of merge candidates included in the second merge candidate list is the same as the maximum number of merge candidates, the merge candidate having the lowest index or the merge candidate having the highest index is detected from the second merge candidate list and a merge candidate derived on the basis of the motion information of the block is added to the second merge candidate list. That is, after deleting the oldest merge candidate among the merge candidates included in the second merge candidate list, a merge candidate derived on the basis of the motion information of the block may be added to the second merge candidate list.

The second merge candidate list may be initialized in a unit of a CTU, a tile or a slice. In other words, a block included in a CTU, a tile or a slice different from a current block may be set to be unavailable as the second merge candidate block. The maximum number of merge candidates which may be included in the second merge candidate list may be predefined in an encoder and a decoder. Alternatively, information representing the maximum number of merge candidates which may be included in the second merge candidate list may be signaled through a bitstream.

Either the first merge candidate list or the second merge candidate list may be selected and inter prediction of the current block may be performed using the selected merge candidate list. Specifically, on the basis of index information, any one of the merge candidates included in the merge candidate list may be selected and motion information of the current block may be acquired from the merge candidate.

Information specifying either the first merge candidate list or the second merge candidate list may be signaled through a bitstream. The decoder may select either the first merge candidate list or the second merge candidate list on the basis of the information.

Alternatively, among the first merge candidate list and the second merge candidate list, the merge candidate list including a larger number of available merge candidates may be selected.

Alternatively, either the first merge candidate list or the second merge candidate list may be selected on the basis of at least one among the size, the shape, and the partition depth of the current block.

Alternatively, a merge candidate list configured by adding (or appending) the other to any of the first merge candidate list and the second merge candidate list.

For example, inter prediction may be performed on the basis of a merge candidate list including at least one merge candidate included in the first merge candidate list, and at least one merge candidate included in the second merge candidate list.

For example, a merge candidate included in the second merge candidate list may be added to the first merge candidate list. Alternatively, a merge candidate included in the first merge candidate list may be added to the second merge candidate.

When the number of merge candidates included in the first merge candidate list is smaller than the maximum number, or when the first merge candidate block is unavailable, a merge candidate included in the second merge candidate list is added to the first merge candidate list.

Alternatively, when the first merge candidate block is unavailable, the merge candidate derived from a block adjacent to the first merge candidate block among the merge candidates included in the second merge candidate list is added to the first merge candidate list. Referring to FIG. 15, when A0 is unavailable, a merge candidate derived on the basis of motion information of B0 among the merge candidates included in the second merge candidate list is added to the first merge candidate list. When A1 is unavailable, a merge candidate derived on the basis of motion information of B1 among the merge candidates included in the second merge candidate list is added to the first merge candidate list. When A2 is unavailable, a merge candidate derived on the basis of motion information of B2 among the merge candidates included in the second merge candidate list is added to the first merge candidate list. When A3 is unavailable, a merge candidate derived on the basis of motion information of B3 among the merge candidates included in the second merge candidate list is added to the first merge candidate list. When A4 is unavailable, a merge candidate derived on the basis of motion information of B4, B5, or B6 among the merge candidates included in the second merge candidate list is added to the first merge candidate list.

Alternatively, a merge candidate to be added to the first merge candidate list may be determined according to the priorities of the merge candidates included in the second merge candidate list. The priorities may be determined based on an index value assigned to each merge candidate. For example, when the number of merge candidates included in the first merge candidate list is smaller than the maximum number, or when the first merge candidate block is unavailable, the merge candidate having the smallest index value or the merge candidate having the largest index value among the merge candidates included in the second merge candidate list is added to the first merge candidate list.

When a merge candidate having the same motion information as a merge candidate with the highest priority among merge candidates included in the second merge candidate list is included in the first merge candidate list, the merge candidate with the highest priority may not be added to the first merge candidate list. In addition, whether a merge candidate with a next priority (e.g., a merge candidate to which an index value larger than an index value assigned to a merge candidate with the highest priority by 1 is assigned or a merge candidate to which an index value smaller than an index value assigned to a merge candidate with the highest priority by 1 is assigned) may be added to the first merge candidate list may be determined.

Alternatively, a merge candidate list including a merge candidate derived on the basis of motion information of the first merge candidate block, and a merge candidate derived on the basis of motion information of the second merge candidate block may be generated. The merge candidate list may be a combination of the first merge candidate list and the second merge candidate list.

For example, according to a predetermined order of searching, a merge candidate list may be generated by searching for the first merge candidate block and the second merge candidate block.

FIGS. 17 to 20 are diagrams illustrating the order of searching for merge candidate blocks.

FIGS. 17 to 20 shows the order of searching for merge candidates as follows.

A0→A1→A2→A3→A4→B0→B1→B2→B3→B4→(B5)→(B6)

Only when a block B4 is unavailable or when the number of merge candidates included in the merge candidate list is equal to or smaller than a preset number, searching for blocks B5 and B6 takes place.

The different order of searching from the examples shown in FIGS. 17 to 20 may be set.

A combined merge candidate list including at least one merge candidate included in the first merge candidate list, and at least one merge candidate included in the second merge candidate list may be generated. For example, the combined merge candidate list may include N of merge candidates included in the first merge candidate list, and M of merge candidates included in the second merge candidate list. The letters N and M may denote the same number or different numbers. Alternatively, at least one among N and M may be determined on the basis of at least one among the number of merge candidates included in the first merge candidate list and the number of merge candidates included in the second merge candidate list. Alternatively, information for determining at least one among N and M may be signaled through a bitstream. Any one among N and M may be derived by subtracting the other from the maximum number of merge candidates in the combined merge candidate list.

Merge candidates to be added to the combined merge candidate list may be determined according to a predefined priority. The predefined priority may be determined on the basis of indexes allocated to the merge candidates.

Alternatively, a merge candidate to be added to the combined merge candidate list may be determined on the basis of association between merge candidates. For example, when A0 included in the first merge candidate list is added to the combined merge candidate list, a merge candidate (for example, B0) at a position adjacent to A0 is not added to a combined merge list.

When the number of the merge candidates included in the first merge candidate list is smaller than N, more than M merge candidates among the merge candidates included in the second merge candidate list are added to the combined merge candidate list. For example, when N is four and M is two, four of the merge candidates included in the first merge candidate list are added to the combined merge candidate list, and two of the merge candidates included in the second merge candidate list are added to the combined merge candidate list. When the number of the merge candidates included in the first merge candidate list is smaller than four, two or more merge candidates among the merge candidates included in the second merge candidate list are added to the combined merge candidate list. When the number of the merge candidates included in the second merge candidate list is smaller than two, four or more of the merge candidates included in the first merge candidate list are added to the combined merge candidate list.

That is, the value of N or M may be adjusted according to the number of merge candidates included in each merge candidate list. By adjusting the value of N or M, the total number of merge candidates included in the combined merge candidate list may be fixed. When the total number of merge candidates included in the combined merge candidate list is smaller than the maximum number of merge candidates, a combined merge candidate, an average merge candidate, or a zero motion vector candidate is added.

A rectangular block may be partitioned into multiple triangular blocks. A merge candidate of triangular blocks may be derived based on a rectangular block including triangular blocks. Triangular blocks may share the same merge candidate.

A merge index may be signaled for each triangular block. In this case, triangular blocks may be set not to use the same merge candidate. In an example, a merge candidate used for a first triangular block may not be used as a merge candidate of a second triangular block. Accordingly, the merge index of the second triangular block may specify any one of remaining merge candidates excluding the merge candidate selected for the first triangular block.

A merge candidate may be derived on the basis of a block having a predetermined shape or a predetermined size or larger. When the current block is not in a predetermined shape, or when the size of the current block is smaller than a predetermined size, a merge candidate of the current block is derived on the basis of a block including the current block and being in the a predetermined shape or in the predetermined size or larger. The predetermined shape may be a square shape or a non-square shape.

When the predetermined shape is a square shape, a merge candidate for a coding unit in a non-square shape is derived on the basis of a coding unit in a square shape including the coding unit in the non-square shape.

Figure 21:
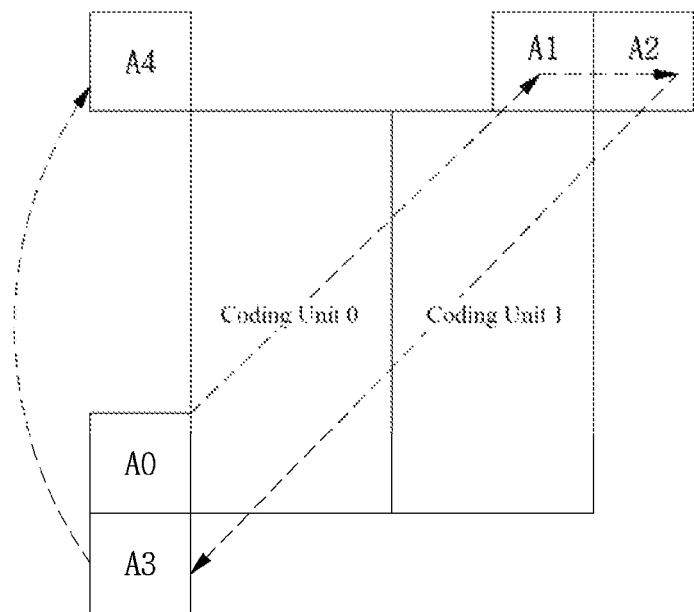
FIG. 21 is a diagram illustrating an example in which a merge candidate of a non-square block is derived on the basis of a square block.
Figure 21:
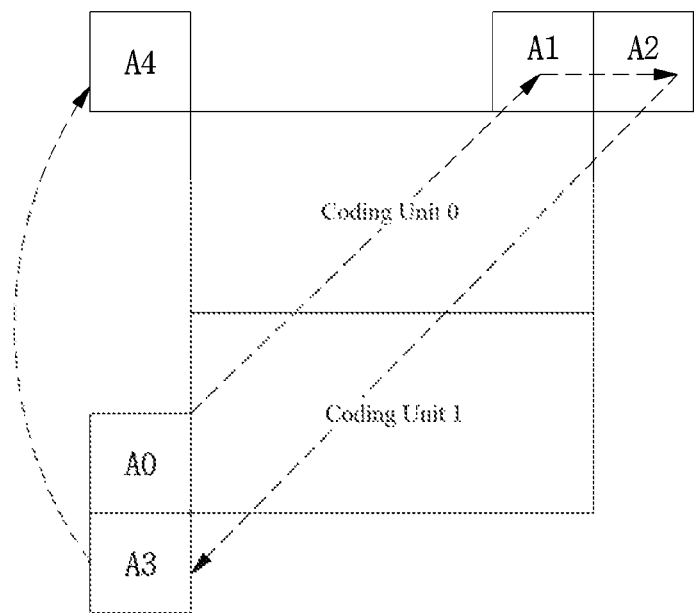

FIG. 21 is a diagram illustrating an example in which a merge candidate of a non-square block is derived on the basis of a square block.

A merge candidate of a non-square block may be derived on the basis of a square block including the non-square block. For example, a merge candidate of a coding block 0 in a non-square shape and a coding block 1 in a non-square shape may be derived on the basis of a block in a square shape including the coding block 0 and the coding block 1. That is, a position of a spatial neighboring block may be determined on the basis of a position, a width/height, or a size of a block in a square shape. A merge candidate of a coding block 0 and a coding block 1 may be derived on the basis of at least one among spatial neighboring blocks A0, A1, A2, A3, and A4 adjacent to a block in a square shape.

A temporal merge candidate may be determined on the basis of a block in a square shape. That is, a temporal neighboring block may be determined on the basis of a position, a width/height, or a size of a block in a square shape. For example, a merge candidate of a coding block 0 and a coding block 1 may be derived on the basis of the temporal neighboring block determined on the basis of the block in the square shape.

Alternatively, any one among a spatial merge candidate and a temporal merge candidate may be derived on the basis of a square block, and the other merge candidate may be derived on the basis of a non-square block. For example, a spatial merge candidate of a coding block 0 may be derived on the basis of a square block, while a temporal merge candidate of the coding block 0 may be derived on the basis of the coding block 0.

Multiple blocks included in a block in a predetermined shape or a predetermined size or larger may share a merge candidate. For example, in the example shown in FIG. 21, at least one among a spatial merge candidate and a temporal merge candidate of a coding block 0 and a coding block 1 may be the same.

The predetermined shape may be a non-square shape, such as 2N×N, N×2N, or the like. When the predetermined shape is a non-square shape, a merge candidate of the current block may be derived on the basis of a non-square block including the current block. For example, when the current block is in a 2N×n shape (herein, n is ½N), a merge candidate of the current block is derived on the basis of a non-square block in a 2N×N shape. Alternatively, when the current block is in a n×2N shape, a merge candidate of the current block is derived on the basis of a non-square block in an N×2N shape.

Information indicating a predetermined shape or a predetermined size may be signaled through a bitstream. For example, information indicating any one among a non-square shape or a square shape may be signaled through a bitstream.

Alternatively, a predetermined shape or a predetermined size may be determined according to a rule predefined in the encoder and the decoder.

When a child node does not satisfy a predetermined condition, a merge candidate of the child node is derived on the basis of a parent node satisfying the predetermined condition. Herein, the predetermined condition may include at least one among whether the block is a block generated as a result of quad tree partitioning, whether exceeding the size of the block, the shape of the block, and the picture boundary takes place, and whether the difference in depth between the child node and the parent node is equal to or greater than a predetermined value.

For example, predetermined conditions may include whether the block is a block generated as a result of quad tree partitioning, and whether the block is a square shape coding block in a predetermined size or larger. When the current block is generated by binary tree partitioning or triple tree partitioning, a merge candidate of the current block is derived on the basis of a high-level node block that includes the current block and satisfies the predetermined conditions. When there is no high-level node block satisfying the predetermined conditions, a merge candidate of a current block is derived on the basis of the current block, a block that includes the current block and is in a predetermined size or larger, or a high-level node block that includes the current block and has the depth difference of one with the current block.

Figure 22:
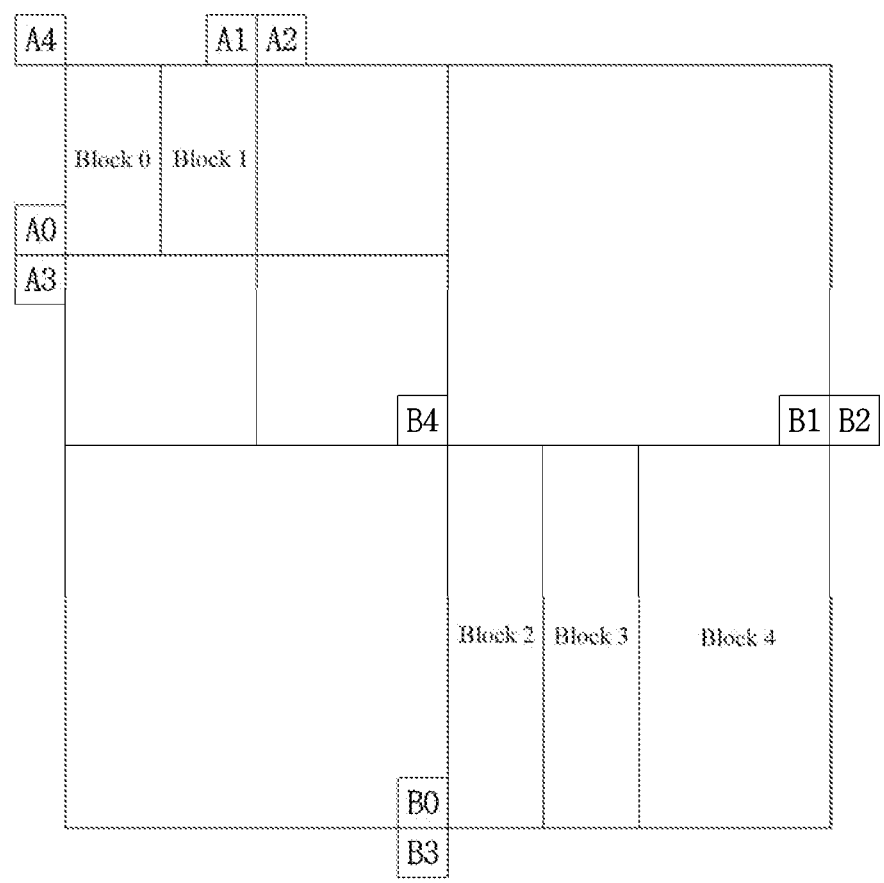
FIG. 22 is a diagram illustrating an example of deriving a merge candidate on the basis of a high-level node block.

FIG. 22 is a diagram illustrating an example of deriving a merge candidate on the basis of a high-level node block.

A block 0 and a block 1 are generated by partitioning a square block on the basis of a binary tree. A merge candidate of the block 0 and the block 1 may be derived on the basis of a neighboring block (that is, at least one among A0, A1, A2, A3, and A4) that is determined on the basis of a high-level node block including the block 0 and the block 1. As a result of this, the block 0 and the block 1 may use the same spatial merge candidate.

A high-level node block including a block 2 and a block 3, and a block 4 may be generated by partitioning a square block on the basis of a binary tree. In addition, the block 2 and the block 3 may be generated by partitioning a block in a non-square shape on the basis of a binary tree. A merge candidate of the block 2, the block 3, and the block 4 in non-square shapes may be derived on the basis of a high-level node block including the same. That is, a merge candidate may be derived on the basis of a neighboring block (for example, at least one among B0, B1, B2, B3, and B4) that is determined on the basis of a position, a width/height, or a size of a square block including the block 2, the block 3, and the block 4. As a result of this, the block 2, the block 3, and the block 4 may use the same spatial merge candidate.

A temporal merge candidate for a block in a non-square shape may be derived on the basis of a high-level node block. For example, a temporal merge candidate for the block 0 and the block 1 may be derived on the basis of a square block including the block 0 and the block 1. A temporal merge candidate for the block 2, the block 3, and the block 4 may be derived on the basis of a square block including the block 2, the block 3, and the block 4. In addition, the same temporal merge candidate derived from a temporal neighboring block determined on a per-quad tree block basis may be used.

Low-level node blocks included in a high-level node block may share at least one among a spatial merge candidate and a temporal merge candidate. For example, the low-level node blocks included in the high-level node block may use the same merge candidate list.

Alternatively, at least one among a spatial merge candidate and a temporal merge candidate may be derived on the basis of a low-level node block, and the other may be derived on the basis of a high-level node block. For example, a spatial merge candidate for the block 0 and the block 1 may be derived on the basis of the high-level node block. However, a temporal merge candidate for the block 0 may be derived on the basis of the block 0, and a temporal merge candidate for the block 1 may be derived on the basis of the block 1.

Alternatively, when the number of samples that a low-level node block includes is smaller than a predefined number, a merge candidate is derived on the basis of a high-level node block including the predefined number or more of samples. For example, when at least one of the following conditions is satisfied: a case where at least one of low-level node blocks generated on the basis of at least one among quad tree partitioning, binary tree partitioning, and triple tree partitioning is smaller than a preset size; a case where at least one of the low-level node blocks is a non-square block; a case where a high-level node block does not exceed a picture boundary; and a case where a width or height of a high-level node block is equal to or greater than a predefined value, a merge candidate is derived on the basis of a high-level node block in a square or non-square shape including a predefined number of more of samples (for example, 64, 128, or 256 samples). The low-level node blocks included in the high-level node block may share merge candidates derived on the basis of the high-level node block.

A merge candidate may be derived on the basis of any one of low-level node block, and the other low-level node blocks may be set to use the merge candidate. The low-level node blocks may be included in a block in a predetermined shape or a predetermined size or larger. For example, low-level node blocks may share a merge candidate list derived on the basis of any one of the low-level node blocks. Information for a low-level node block that is the basis of derivation of the merge candidate may be signaled through a bitstream. The information may be index information indicating any one of low-level node blocks. Alternatively, the low-level node block that is the basis of derivation of the merge candidate may be determined on the basis of at least one among positions, sizes, shapes, and the scanning order of the low-level node blocks.

Information indicating whether low-level node blocks share a merge candidate list derived on the basis of a high-level node block may be signaled through a bitstream. On the basis of the information, it may be determined whether a merge candidate of a block not in a predetermined shape or a block in a size smaller than a predetermined size is derived on the basis of a high-level node block including the block. Alternatively, according to a rule predefined in the encoder and the decoder, it may be determined whether a merge candidate is derived on the basis of a high-level node block.

When a neighboring block adjacent to the current block is present within a predefined region, it is determined that the neighboring block is unavailable as a spatial merge candidate. The predefined region may be a parallel-processing region defined for parallel processing between blocks. The parallel-processing region may be referred to as a merge estimation region (MER). For example, when a neighboring block adjacent to the current block is included in the same merge estimation region as the current block, it is determined that the neighboring block is unavailable. A shift operation may be performed so as to determine whether the current block and the neighboring block are included in the same merge estimation region. Specifically, on the basis of whether a value obtained by shifting the position of the top left reference sample of the current block is the same as a value obtained by shifting the position of the top left reference sample of the neighboring block, it may be determined whether the current block and the neighboring block are included in the same merge estimation region.

Figure 23:
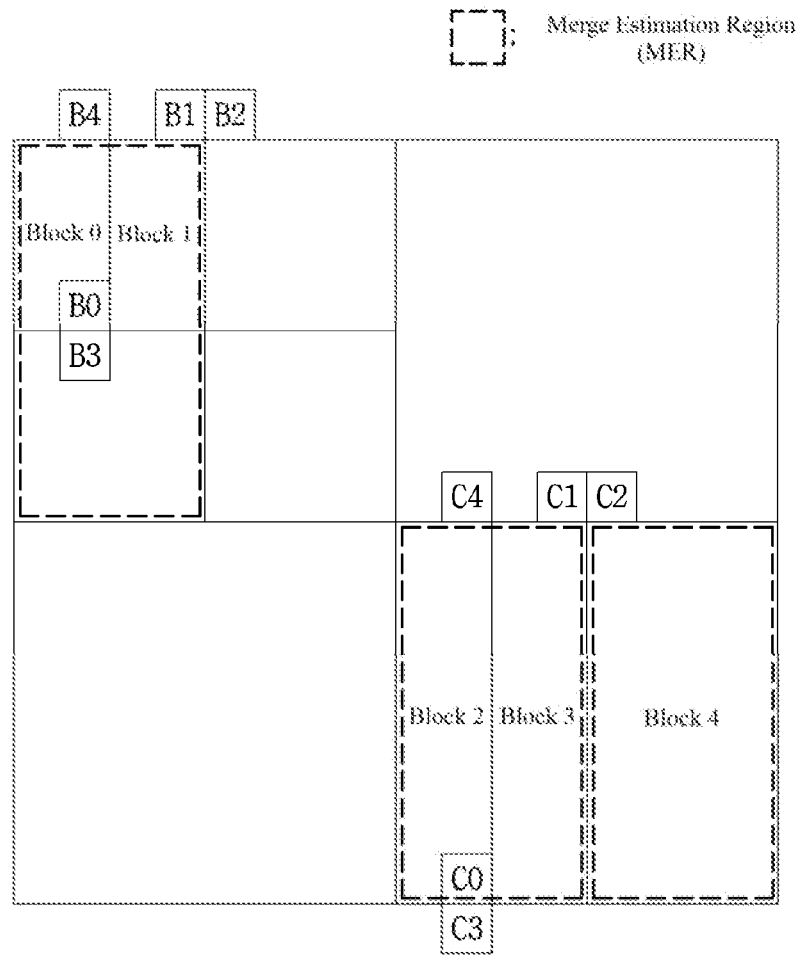
FIG. 23 is a diagram illustrating an example of determining availability of a spatial neighboring block on the basis of a merge estimation region.

FIG. 23 is a diagram illustrating an example of determining availability of a spatial neighboring block on the basis of a merge estimation region.

In FIG. 23, it is shown that a merge estimation region is in a N×2N shape.

A merge candidate of a block 1 may be derived on the basis of a spatial neighboring block adjacent to the block 1. The spatial neighboring blocks may include B0, B1, B2, B3, and B4. Herein, it may be determined that the spatial neighboring blocks B0 and B3 included in the same merge estimation region as the block 1 is unavailable as merge candidates. Accordingly, a merge candidate of the block 1 may be derived from at least one of the spatial neighboring blocks B1, B2, and B4 excluding the spatial neighboring blocks B0 and B3.

A merge candidate of a block 3 may be derived on the basis of a spatial neighboring block adjacent to the block 3. The spatial neighboring blocks may include C0, C1, C2, C3, and C4. Herein, it may be determined that the spatial neighboring block C0 included in the same merge estimation region as the block 3 is unavailable as a merge candidate. Accordingly, a merge candidate of the block 3 may be derived from at least one of the spatial neighboring blocks C1, C2, C3, and C4 excluding the spatial neighboring block C0.

On the basis of at least one among a position, a size, a width, and a height of a merge estimation region, a merge candidate of a block included in the merge estimation region may be derived. For example, a merge candidate of multiple blocks included in a merge estimation region may be derived from at least one among a spatial neighboring block and a temporal neighboring block that are determined on the basis of at least one among a position, a size, a width, and a height of the merge estimation region. The blocks included in the merge estimation region may share the same merge candidate.

Figure 24:
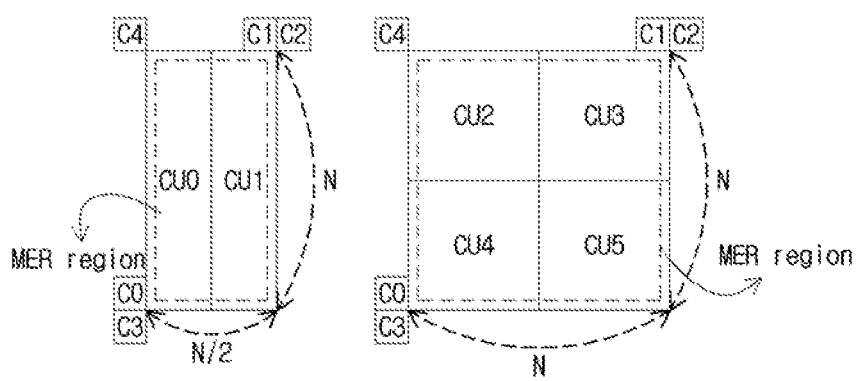
FIG. 24 is a diagram illustrating an example in which a merge candidate is derived on the basis of a merge estimation region.

FIG. 24 is a diagram illustrating an example in which a merge candidate is derived on the basis of a merge estimation region.

When multiple coding units are included in a merge estimation region, a merge candidate of the multiple coding units may be derived on the basis of the merge estimation region. That is, by using the merge estimation region as a coding unit, a merge candidate may be derived on the basis of the position, the size, or the width/height of the merge estimation region.

For example, a merge candidate of a coding unit 0 (CU0) and a coding unit 1 (CU1) both in a (n/2)×N (herein, n is N/2) size and included in a merge estimation region in a (N/2)×N size may be derived on the basis of the merge estimation region. That is, a merge candidate of the coding unit 0 and the coding unit 1 may be derived from at least one of neighboring blocks C0, C1, C2, C3, and C4 adjacent to the merge estimation region.

For example, a merge candidate of a coding unit 2 (CU2), a coding unit 3 (CU3), a coding unit 4 (CU4), and a coding unit 5 (CU5) in an n×n size included in a merge estimation region in an N×N size may be derived on the basis of the merge estimation region. That is, a merge candidate of the coding unit 2, the coding unit 3, the coding unit 4, and the coding unit 5 may be derived from at least one of the neighboring blocks C0, C1, C2, C3, and C4 adjacent to the merge estimation region.

The shape of the merge estimation region may be a square shape or a non-square shape. For example, it may be determined that a coding unit (or prediction unit) in a square shape or a coding unit (or prediction unit) in a non-square shape is a merge estimation region. The ratio between the width and the height of the merge estimation region may be limited not to exceed a predetermined range. For example, the merge estimation region is unable to have a non-square shape of which the ratio between the width and the height exceeds two, or a non-square shape of which the ratio between the width and the height is less than ½. That is, the non-square merge estimation region may be in a 2N×N or N×2N shape. Information on a limit on the ratio between the width and the height may be signaled through a bitstream. Alternatively, a limit on the ratio between the width and the height may be predefined in the encoder and the decoder.

At least one among information indicating the shape of the merge estimation region, and information indicating the size of the merge estimation region may be signaled through a bitstream. For example, at least one among the information indicating the shape of the merge estimation region, and the information indicating the size of the merge estimation region may be signaled through a slice header, a tile group header, a picture parameter, or a sequence parameter.

The shape of the merge estimation region or the size of the merge estimation region may be updated on a per-sequence basis, a per-picture basis, a per-slice basis, a per-tile group basis, a per-tile basis, or a per-block (CTU) basis. When the shape of the merge estimation region or the size of the merge estimation region is different from that of the previous unit, information indicating a new shape of the merge estimation region or a new size of the merge estimation region is signaled through a bitstream.

At least one block may be included in the merge estimation region. The block included in the merge estimation region may be in a square shape or a non-square shape. The maximum number or the minimum number of blocks that the merge estimation region is able to include may be determined. For example, two, three, four, or more CUs may be included in the merge estimation region. The determination may be based on information signaled through a bitstream. Alternatively, the maximum number or the minimum number of blocks that the merge estimation region is able to include may be predefined in the encoder and the decoder.

In at least one among a case where the number of blocks included in the merge estimation region is smaller than the maximum number, and a case where the number is larger than the minimum number, parallel processing of the blocks may be allowed. For example, when the number of blocks included in the merge estimation region is equal to or smaller than the maximum number, or when the number of blocks included in the merge estimation region is equal to or larger than the minimum number, a merge candidate of the blocks is derived on the basis of the merge estimation region. When the number of blocks included in the merge estimation region is larger than the maximum number, or when the number of blocks included in the merge estimation region is smaller than the minimum value, a merge candidate of each of the blocks is derived on the basis of the size, the position, the width, or the height of each of the blocks.

Information indicating the shape of the merge estimation region may include a one-bit flag. For example, the syntax "isrectagular_mer_flag" may indicate that the merge candidate region in a square shape or a non-square shape. The isrectagular_mer_flag value of one may indicate that the merge estimation region in a non-square shape, and the isrectagular_mer_flag value of zero may indicate that the merge estimation region in a square shape.

When the information indicates that the merge estimation region in a non-square shape, information indicating at least one among the width, the height, and the ratio between the width and the height of the merge estimation region is signaled through a bitstream. On the basis of this, the size and/or the shape of the merge estimation region may be determined. A plurality of merge determination regions having different sizes may exist in the sequence.

As in the above example, a block to be subjected to inter prediction and a block to be a criterion for deriving a merge candidate may be different. When the block to be subjected to inter prediction and the block to be a criterion for deriving a merge candidate are different from each other, a merge candidate list of the current block may be constructed in consideration of at least one of motion information of a neighboring block or a merge index of a neighboring block.

As an example, when a merge candidate of the current block is derived based on an upper node block including the current block, a merge candidate having the same motion information as a neighboring block included in the upper node block or a merge candidate identical to a merge candidate indicated by the merge index of the neighboring block may be determined to be unavailable as a merge candidate of the current block.

Figure 25:
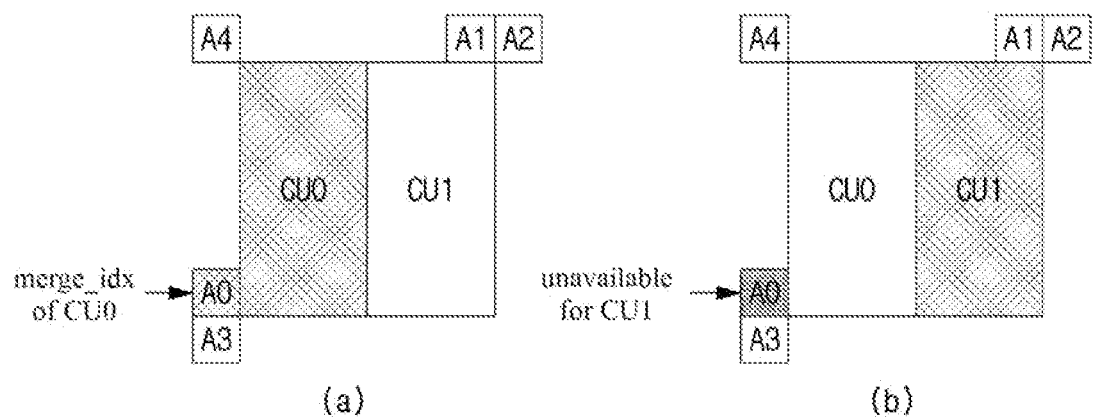
FIG. 25 is a diagram illustrating an example of determining a merge candidate list of a current block based on a merge index of a neighboring block.

FIG. 25 is a diagram illustrating an example of determining a merge candidate list of a current block based on a merge index of a neighboring block.

Block 0 and block 1 may be blocks included in one parallel derivation region. Alternatively, block 0 and block 1 may be included in an upper node block to be a criterion for deriving a merge candidate. In FIG. 25, blocks 0 and 1 are illustrated as non-square blocks. However, even when blocks 0 and 1 are triangular blocks or square blocks, an embodiment described below may be applied.

The merge candidate of block 0 may be derived based on a square block including block 0. As an example, the merge candidate of block 0 may be derived based on at least one of A0, A1, A2, A3, or A4 adjacent to a square block including block 0. A merge index for block 0 may be encoded, and motion information of a merge candidate indicated by the merge index may be set as motion information of block 0.

The merge candidate of block 1 may be derived based on a square block including block 1. As an example, a merge candidate of block 1 may be derived based on at least one of A0, A1, A2, A3, or A4 adjacent to a square block including block 1. In this case, a merge candidate having the same motion information as the motion information of block 0 or a merge candidate indicated by the merge index of block 0 may be determined to be unavailable as a merge candidate of block 1. As an example, when the merge index of block 0 indicates A1, A1 may not be included in the merge candidate list of block 1. That is, the merge candidate list of block 0 excluding the merge candidate indicated by the merge index of block 0 may be set as the merge candidate list of block 1.

For example, when the merge index of block 1 is smaller than the merge index of block 0, motion information of block 1 may be derived from a merge candidate indicated by the merge index of block 1. On the other hand, when the merge index of block 1 is equal to or greater than the merge index of block 0, motion information of block 1 may be derived from a merge candidate corresponding to a value obtained by adding 1 to the merge index of block 1.

Even if block 0 is not coded in the merge mode, a merge candidate having the same motion information as block 0 may be set to be unavailable as a merge candidate of block 1.

Merge candidates of block 2, block 3, and block 4 may be derived based on an upper node block including them. In this case, a merge candidate having the same motion information as block 2 or a merge candidate indicated by the merge index of block 2 may be set to be unavailable as a merge candidate of block 3. In addition, a merge candidate having the same motion information as block 3 or a merge candidate indicated by the merge index of block 3 may be set to be unavailable as a merge candidate of block 4. That is, the merge candidate lists of blocks 3 and 4 may not include a merge candidate identical to motion information of a neighboring block adjacent to each block.

Information indicating a merge candidate that is the same as the motion information of the current block may be signaled through a bitstream. The information may be index information indicating at least one of a plurality of merge candidates included in the merge candidate list. The index information may indicate at least one index (or merge index) among a plurality of merge candidates included in the merge candidate list. The motion information of the current block may be set equal to the motion information of the merge candidate indicated by the index information.

Merge candidates to be included in the merge candidate list may be determined based on a predetermined order. The predetermined order may represent at least one of a priority between spatial neighboring blocks or a priority between a spatial merge candidate and a temporal merge candidate. For example, a spatial merge candidate may have a higher priority than a temporal merge candidate. In addition, a priority among spatial neighboring blocks may be determined based on a search order of spatial neighboring blocks. A higher priority may be given to a spatial neighboring block having a faster search order. Merge indexes allocated to merge candidates included in the merge candidate list may be sequentially allocated by applying a descending order of priority. That is, the smallest merge index may be allocated to the merge candidate having the highest priority.

Merge candidates included in the merge candidate list may be reordered (or rearranged). As a result of reordering, the merge index allocated to the merge candidate may be changed. The reordering may be performed based on at least one of whether a bi-prediction is performed, a prediction direction, a size of a motion vector, or an output order (e.g., POC) difference between a current picture and a reference picture. For example, a merge candidate performing bi-prediction may have a higher priority than a merge candidate performing uni-prediction. Accordingly, an index allocated to the merge candidate performing bi-prediction may have a smaller value than an index allocated to the merge candidate performing uni-prediction.

Figure 26:
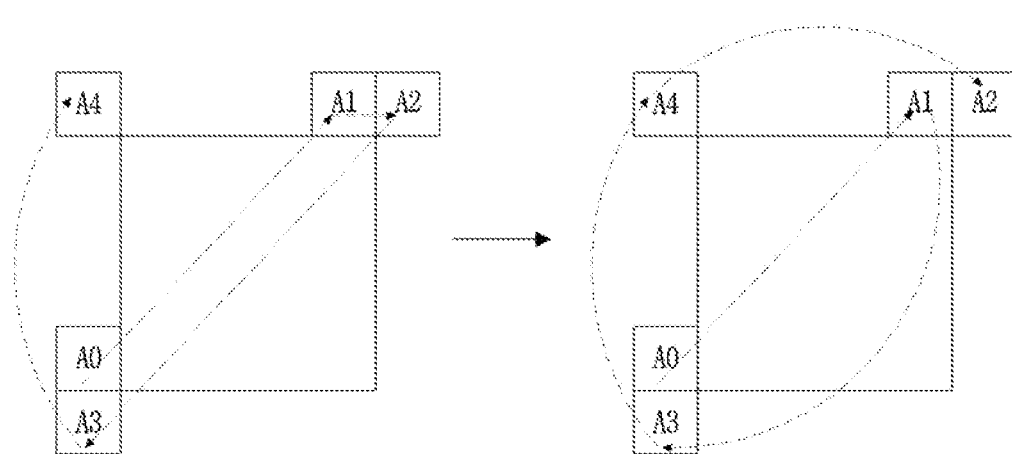
FIGS. 26 and 27 are diagrams illustrating an example in which merge candidates are reordered.
Figure 27:
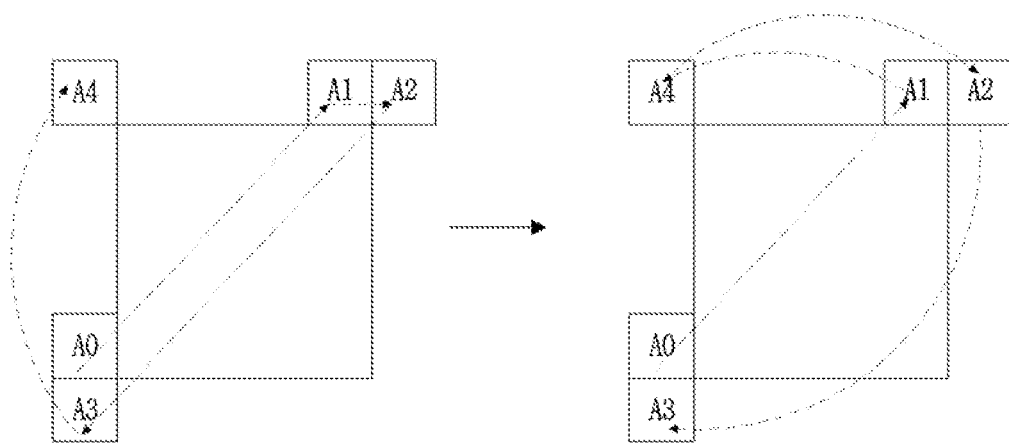

FIGS. 26 and 27 are diagrams illustrating an example in which merge candidates are reordered.

In FIGS. 26 and 27, it is assumed that merge candidates are arranged in the order of A0, A1, A2, A3, A4 in the initial merge candidate list. In FIG. 26, it is assumed that a plurality of merge candidates representing bi-prediction exist, and in FIG. 27, it is assumed that a plurality of merge candidates representing uni-prediction exist.

In the example of FIG. 26, when A2 indicates uni-prediction and A0, A1, A3, and A4 indicate bi-prediction, A2 indicating uni-prediction may be placed at the end of the merge candidate list.

When there are a plurality of merge candidates indicating bi-prediction, the priority between the plurality of merge candidates may follow the priority within the initial merge candidate list. As a result, the arrangement of merge candidates in the initial merge candidate list may be changed in the order of A0, A1, A3, A4, A2.

Alternatively, when there are a plurality of merge candidates indicating bi-prediction, the priority between the plurality of merge candidates may be determined based on at least one of a size of a motion vector or an output order difference between a current picture and a reference picture.

In the example of FIG. 27, when A2 and A3 indicate uni-prediction and A0, A1 and A4 indicate bi-prediction, A2 and A3 indicating uni-prediction may be placed at the end of the merge candidate list.

When there are a plurality of merge candidates indicating uni-prediction, the priority between the plurality of merge candidates may follow the priority in the initial merge candidate list. As a result, the arrangement of merge candidates in the initial merge candidate list may be changed in the order of A0, A1, A4, A2, A3.

Alternatively, when there are a plurality of merge candidates indicating uni-prediction, a priority order among the plurality of merge candidates may be determined based on at least one of a size of a motion vector or an output order difference between a current picture and a reference picture.

Information indicating whether to perform reordering on merge candidates may be signaled through a bitstream. The information may be a 1-bit flag. Alternatively, whether to perform reordering on merge candidates may be determined based on the inter prediction mode of the current block. Alternatively, whether to perform reordering may be determined based on whether a plurality of merge candidates to be described later are used.

Motion information of the current block may be derived from a plurality of merge candidates. That is, motion information of the current block may be derived by selecting two or more of the merge candidates included in the merge candidate list of the current block.

Figure 28:
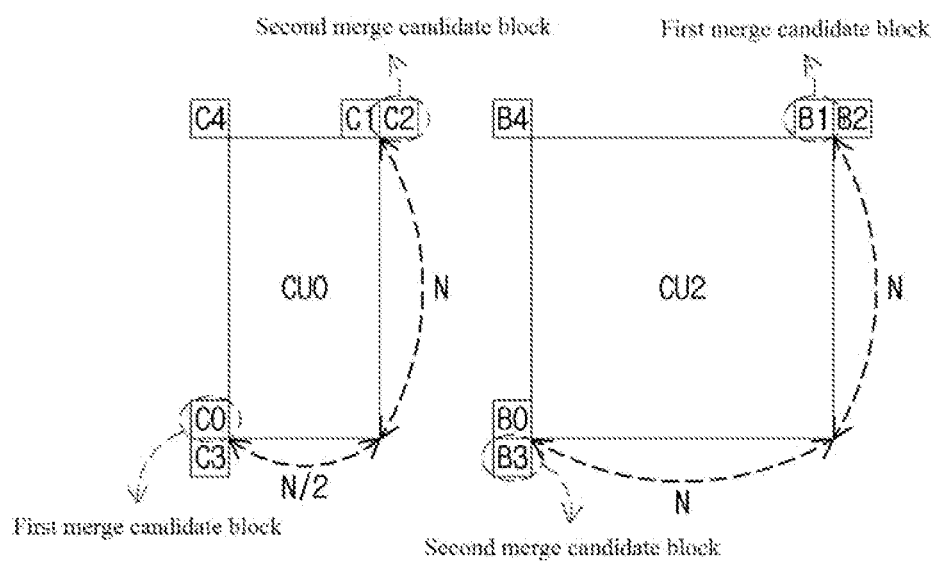
FIG. 28 is a diagram for describing an example of obtaining motion information of a current block based on a plurality of merge candidates.

FIG. 28 is a diagram for describing an example of obtaining motion information of a current block based on a plurality of merge candidates.

The merge candidate list of coding unit 0 may include a merge candidate derived from a neighboring block adjacent to coding unit 0. As an example, the merge candidate list of coding unit 0 may include at least one of C0, C1, C2, C3, or C4.

In order to obtain motion information of coding unit 0, a plurality of merge candidates may be selected. As an example, C0 and C2 may be selected among merge candidates included in the merge candidate list, and motion information of the coding unit 0 may be determined based on the selected merge candidates.

The merge candidate list of coding unit 1 may include a merge candidate derived from a neighboring block adjacent to coding unit 0. For example, the merge candidate list of coding unit 1 may include at least one of B0, B1, B2, B3, or B4.

In order to obtain motion information of coding unit 1, a plurality of merge candidates may be selected. For example, B1 and B3 may be selected among merge candidates included in the merge candidate list, and motion information of coding unit 1 may be determined based on the selected merge candidates.

In the embodiment described below, N merge candidates selected to determine a motion vector of a current block among a plurality of merge candidates included in the merge candidate list are respectively referred to as a first merge candidate, a second merge candidate . . . , an N-th merge candidate. The referred order may be determined by merge indexes of merge candidates. For example, the first merge candidate represents a merge candidate having the smallest merge index among N merge candidates, and the N-th merge candidate represents a merge candidate having the largest merge index among N merge candidates.

The motion vector of the current block may be determined based on a value obtained by adding motion vectors of a plurality of merge candidates or a value obtained by scaling at least one motion vector. Alternatively, the motion vector of the current block may be determined based on a weighted sum operation or an average operation of motion vectors of a plurality of merge candidates.

Equation 1 shows an example of deriving a motion vector of a current block by adding the motion vectors of the first merge candidate and the second merge candidate.

$$mvL0=mvL0\_1+mvL0\_2$$

$$mvL1=mvL1\_1+mvL1\_2 \qquad \text{[Equation 1]}$$

In Equation 1, mvL0 represents the L0 motion vector of the current block, and mvL1 represents the L1 motion vector of the current block. mvL0_N (N is 1 or 2) represents the L0 motion vector of the N-th merge candidate, and mvL1_N represents the L1 motion vector of the N-th merge candidate.

The motion vector of the current block may be derived by adding a value obtained by scaling the second motion vector to the first motion vector. Equation 2 shows an example of deriving the motion vector of the current block by adding a motion vector of the first merge candidate and a scaled motion vector of the second merge candidate.

$$mvL0=mvL0\_1+(mvL0\_2>>M)$$

$$mvL1=mvL1\_1+(mvL1\_2>>M) \qquad \text{[Equation 2]}$$

In Equation 2, M represents a scale parameter. Information for determining the scale parameter may be signaled through a bitstream. The scale parameter may be determined in units of slices or blocks. Alternatively, the scale parameter may be determined based on an output order (e.g., POC) difference between a reference picture of the first merge candidate and a reference picture of the second merge candidate. Alternatively, the scale parameter may be determined based on a difference of merge indexes between the first merge candidate and the second merge candidate. For example, when the merge index of the first merge candidate is n and the merge index of the second merge candidate is m, the scale parameter M may be determined as (m-n).

An average value of motion vectors of a plurality of merge candidates may be determined as a motion vector of the current block. Equation 3 shows an example in which the average value of motion vectors of the first merge candidate and the second merge candidate is determined as the motion vector of the current block. An example of deriving the motion vector of the current block by adding a motion vector of the first merge candidate and a scaled motion vector of the second merge candidate is shown.

$$mvL0=(mvL0\_1+mvL0\_2)>>1$$

$$mvL1=(mvL1\_1+mvL1\_2)>>1 \qquad \text{[Equation 3]}$$

At least one of a reference picture index, a bi-prediction flag, or a bi-prediction weight of the current block may be set equal to any one of the plurality of merge candidates. For example, at least one of a reference picture index, a bi-prediction flag, or a bi-prediction weight of the current block may be set to be the same as a merge candidate having the smallest merge index or a merge candidate having the largest index among the plurality of merge candidates. Alternatively, at least one of a reference picture index, a bi-prediction flag, or a bi-prediction weight of the current block may be derived from the merge candidate selected by the first or last index information among a plurality of index information. Alternatively, at least one of a reference picture index, a bi-prediction flag, or a bi-prediction weight of the current block may be derived from a merge candidate specified by index information first parsed from the bitstream among the plurality of merge candidates. Alternatively, at least one of a reference picture index, a bi-prediction flag, or a bi-prediction weight of the current block may be derived from a predefined merge candidate among the plurality of merge candidates.

Information indicating whether motion information of the current block is determined based on a plurality of merge candidates may be signaled through a bitstream. The information may be a 1-bit flag. Alternatively, the information may indicate the number of merge candidates for determining motion information of the current block. For example, the information equal to 1 may indicate that motion information of the current block is determined based on one merge candidate. The information equal to 01 may indicate that motion information of the current block is determined based on two merge candidates. The information equal to 11 may indicate that the motion information of the current block is determined based on three merge candidates. More than three merge candidates may be used.

Alternatively, when the merge candidate indicated by the index information of the current block is encoded by uni-prediction (i.e., the merge candidate has only uni-directional motion information), an additional merge candidate may be selected. In this case, motion information of a different direction from uni-directional motion information derived from the first merge candidate may be derived from the second merge candidate.

Figure 29:
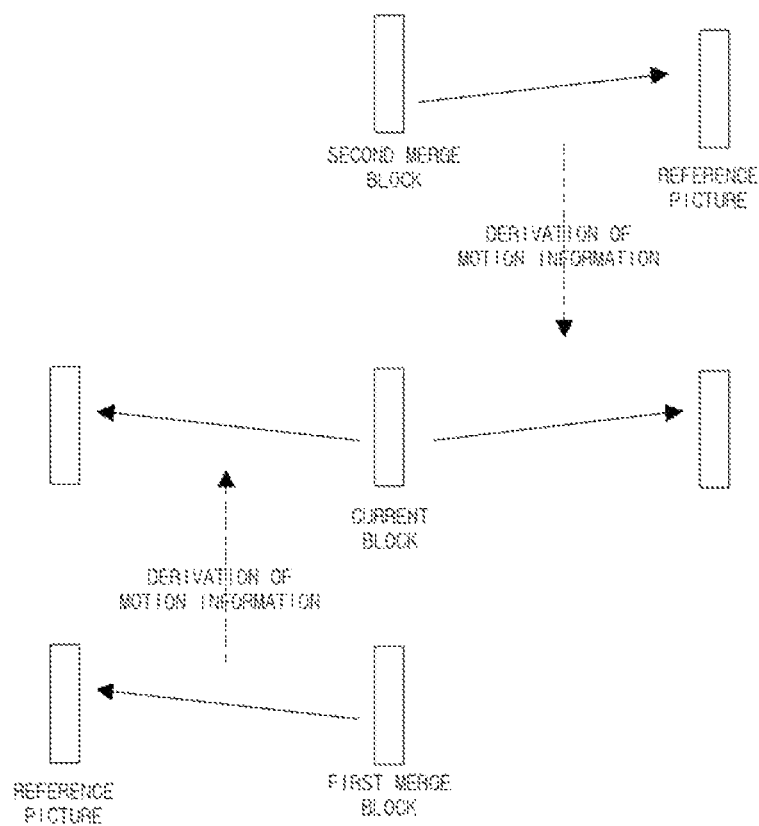
FIG. 29 is a diagram illustrating an example of deriving motion information of a current block from a plurality of merge candidates.

FIG. 29 is a diagram illustrating an example of deriving motion information of a current block from a plurality of merge candidates.

When the motion information of the first merge candidate indicates the use of uni-prediction (L0) and the L0 reference picture list, motion information in the L0 direction of the current block may be derived from the first merge candidate.

In addition, motion information in the L1 direction of the current block may be obtained from the second merge candidate, by specifying the second merge candidate including prediction information for the L1 direction. Specifically, when the second merge candidate indicates bi-prediction, the L1 reference picture list of the second merge candidate may be set as the L1 reference picture list of the current block. Alternatively, when the second merge candidate indicates uni-prediction and use of the L reference picture list, the L1 reference picture list of the second merge candidate may be set as the L1 reference picture list of the current block.

Uni-directional information of the second merge candidate may be applied to bi-directions of the current block. As an example, the L0 reference picture list and the L1 reference picture list of the current block may be derived from uni-directional prediction information of the second merge candidate. Assuming that the motion vector of the current block is derived based on Equation 2, values of mvLX0_1 and mvLX0_2 may be set to be the same. When the uni-directional prediction information of the second merge candidate is applied to bi-directions of the current block, the scaling parameter for the L0 direction and the scaling parameter for the L1 direction may be set differently.

$$mvLX0 = mvLX0\_1 + (mvLX0\_2 >> M)$$

$$mvLX1 = mvL1\_1 + (mvLX1\_2 >> N) \quad \text{[Equation 4]}$$

As an example, when the second merge candidate is uni-prediction and uses the L0 reference picture list, the scaling parameter M shown in Equation 4 may have a value smaller than N. When the second merge candidate is uni-prediction and uses the L1 reference picture list, the scaling parameter M shown in Equation 4 may have a value greater than N.

Index information identifying each of the plurality of merge candidates may be signaled through a bitstream. As an example, the first merge candidate may be selected based on first index information, and the second merge candidate may be selected based on second index information. In this case, the second index information may indicate any one of the remaining merge candidates excluding the first merge candidate. That is, when the second index information is less than the first index information, a merge candidate corresponding to the second index information may be determined as the second merge candidate. When the second index information is equal to or greater than the first index information, a merge candidate corresponding to a value obtained by adding 1 to the second index information may be determined as the second merge candidate.

Alternatively, the second merge candidate may be selected from among merge candidates having the same at least one of the reference picture index or the bi-prediction flag as the first reference picture. In this case, the second index information may specify any one of merge candidates having the same at least one of the reference picture index or the bi-prediction flag as the first reference picture.

Alternatively, a first merge candidate may be determined based on index information, and a second merge candidate may be determined by adding/subtracting an offset to the merge index of the first merge candidate. The offset may be a natural number such as 1, 2, 3 or 4. An offset value may be predefined in the encoder and decoder. Alternatively, information for determining the offset value may be signaled through a bitstream.

Alternatively, a first merge candidate may be determined based on index information, and a merge candidate spatially adjacent to the first merge candidate may be determined as a second merge candidate. As an example, when the first merge candidate corresponds to a neighboring block adjacent to the left of the current block, a merge candidate derived from a block adjacent to the bottom-left corner of the current block or a merge candidate derived from a block adjacent to the top-left corner of the current block may be determined as the second merge candidate.

Alternatively, the first merge candidate may be determined based on index information, and the merge candidate pre-promised by the encoder and the decoder may be determined as the second merge candidate. The pre-promised merge candidate may be a merge candidate having the smallest merge index or a merge candidate having the largest merge index among merge candidates included in the merge candidate list.

Alternatively, a first merge candidate may be determined based on index information, and a merge candidate having the same at least one of the reference picture index or the bi-prediction flag as the first merge candidate may be determined as a second merge candidate. When a plurality of merge candidates having the same reference picture index or bi-prediction flag as the first merge candidate exist, a merge candidate having the smallest index value, a merge candidate having the smallest index value difference from the first merge candidate, or a merge candidate encoded by bi-prediction may be selected.

Alternatively, when the first merge candidate determined based on the index information is encoded by a first direction prediction, a merge candidate having second direction motion information may be selected as the second merge candidate. When there are a plurality of merge candidates having the second direction motion information, a merge candidate having the smallest index value, a merge candidate having the smallest index value difference from the first merge candidate, or a merge candidate encoded by bi-prediction may be selected.

Instead of selecting a plurality of merge candidates, a merge candidate generated by combining a plurality of merge candidates may be added to the merge candidate list. For example, when the number of merge candidates included in the merge candidate list is less than the number of the maximum merge candidates, an average merge candidate having an average value of motion vectors of a plurality of merge candidates as a motion vector may be added to the merge candidate list.

The current block may be divided into a plurality of partitions, motion information of a first partition among the plurality of partitions may be derived from the first merge candidate, and motion information of a second partition may be derived from the second merge candidate. Motion compensation for the first partition is performed based on motion information derived from the first merge candidate, and motion compensation for the second partition is performed based on motion information derived from the second candidate. In this case, an interpolation filter may be applied to samples located at the boundary between the first partition and the second partition and/or samples adjacent to the boundary. The coefficient of the interpolation filter may be determined based on at least one of a size of a current block, a shape of a current block, or a position of a sample.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments have been described on the basis of a series of steps or flowcharts, they are not intended to limit the inventive time-series order, and may be performed simultaneously or in a different order. In addition, each of the components (for example, units, modules, etc.) constituting the block diagram in the above-described embodiment may be implemented as a hardware device or software, and a plurality of components may be combined into one hardware device or software. The above-described embodiments may be implemented in the form of program instructions that may be executed through various computer components and recorded in a computer-readable recording medium. The computer-readable storage medium may include a program instruction, a data file, a data structure, and the like either alone or in combination thereof. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. The hardware devices may be configured to be operated by one or more software modules or vice versa to conduct the processes according to the present invention.

INDUSTRIAL APPLICABILITY

The present invention may be applied to an electronic device capable of encoding/decoding an image.

The invention claimed is:

1. A method of decoding a video, the method comprising:
deriving a plurality of merge candidates for a current block;
constructing a merge candidate list by adding the plurality of merge candidates thereto, wherein during the construction of the merge candidate list, a new merge candidate generated based on two of the plurality of merge candidates is further added to the merge candidate list;
after completing the construction of the merge candidate list, selecting a first merge candidate and a second merge candidate from the merge candidate list; and
obtaining prediction samples of the current block based on first motion information derived from the first merge candidate and second motion information derived from the second merge candidate,
wherein two pieces of index information are explicitly signaled via a bitstream to select the first merge candidate and the second merge candidate, first index information being used to select the first merge candidate and second index information being used to select the second merge candidate,
wherein when the second index information is less than the first index information, a merge candidate that has an index identical to the second index information is selected as the second merge candidate, and
wherein when the second index information is equal to or greater than the first index information, a merge candidate that has an index derived by adding 1 to the second index information is selected as the second merge candidate.

2. A method of encoding a video, the method comprising:
deriving a plurality of merge candidates for a current block;
constructing a merge candidate list by adding the plurality of merge candidates thereto, wherein during the construction of the merge candidate list, a new merge candidate generated based on two of the plurality of merge candidates is further added to the merge candidate list;
after completing the construction of the merge candidate list, selecting a first merge candidate and a second merge candidate from the merge candidate list;
obtaining prediction samples of the current block based on first motion information of derived from the first merge candidate and second motion information derived from the second merge candidate,
wherein two pieces of index information are explicitly encoded into a bitstream to specify the first merge candidate and the second merge candidate, first index information being used to specify the first merge candidate and second index information being used to specify the second merge candidate,
wherein when an index of the second merge candidate is less than an index of the first merge candidate, a value of the second index information is set identical to the index of the second merge candidate, and
wherein when the index of the second merge candidate is greater than the index of the first merge candidate, the value of the second index information is set identical to a value resulting from subtracting 1 from the index of the second merge candidate.

3. A non-statutory computer-readable medium for storing compressed video data, the compressed video data comprising:
first index information to specify a first merge candidate from a merge candidate list; and
second index information to specify a second merge candidate from the merge candidate list,
wherein the merge candidate list of a current block is constructed by adding a plurality of merge candidates thereto,
wherein during the construction of the merge candidate list, a new merge candidate generated based on two of the plurality of merge candidates is further added to the merge candidate list,
wherein after completing the construction of the merge candidate list, the first and the second merge candidates are selected from the merge candidate list based on the first index information and the second index information, respectively,
wherein prediction samples of the current block are obtained based on first motion information derived from the first merge candidate and second motion information derived from the second merge candidate, wherein when an index of the second merge candidate is less than an index of the first merge candidate, the second index information has a value identical to the index of the second merge candidate, and wherein when the index of the second merge candidate is greater than the index of the first merge candidate, the second index information has a value resulting from subtracting 1 from the index of the second merge candidate.

4. The method of claim 1, wherein whether only the first merge candidate is selected from the merge candidate list or both the first and the second merge candidates are selected from the merge candidate list is determined based on a 1-bit flag explicitly signaled via the bitstream.

5. The method of claim 1, wherein when the second merge candidate has L0 motion information and L1 motion information, only one of the L0 motion information and the L1 motion information of the second merge candidate is derived as the second motion information.

\* \* \* \* \*